United States Patent
Pattee

(10) Patent No.: US 8,277,740 B2
(45) Date of Patent: Oct. 2, 2012

(54) OZONE GENERATOR

(75) Inventor: Harley J. Pattee, Ocala, FL (US)

(73) Assignee: Housh Koshbin, Lisle, IL (US)

( * ) Notice: Subject to any disclaimer, the term of this patent is extended or adjusted under 35 U.S.C. 154(b) by 1523 days.

(21) Appl. No.: 11/437,968

(22) Filed: May 19, 2006

(65) Prior Publication Data

US 2006/0263276 A1 Nov. 23, 2006

Related U.S. Application Data

(60) Provisional application No. 60/683,258, filed on May 20, 2005.

(51) Int. Cl.
*B01J 19/08* (2006.01)
(52) U.S. Cl. .................. 422/186.07; 422/186.3
(58) Field of Classification Search ............. 422/186.07, 422/186.3
See application file for complete search history.

(56) References Cited

U.S. PATENT DOCUMENTS

| | | | |
|---|---|---|---|
| 4,992,169 A | 2/1991 | Izumiya | |
| 5,411,713 A * | 5/1995 | Iwanaga | 422/186.15 |
| 5,601,786 A | 2/1997 | Monagan | |
| 7,326,387 B2 * | 2/2008 | Arts et al. | 422/186.3 |
| 2004/0047776 A1 * | 3/2004 | Thomsen | 422/186.07 |
| 2004/0096354 A1 * | 5/2004 | Nomura et al. | 422/23 |
| 2004/0120845 A1 | 6/2004 | Potember et al. | |
| 2005/0226762 A1 | 10/2005 | Naarup | |
| 2006/0144691 A1 | 7/2006 | Barnes et al. | |
| 2007/0053806 A1 | 3/2007 | Jo | |
| 2009/0180934 A1 | 7/2009 | Khoshbin | |

FOREIGN PATENT DOCUMENTS

| | | |
|---|---|---|
| JP | 07-313581 | 5/1995 |
| KR | 10-2003-0071697 | 9/2003 |

OTHER PUBLICATIONS

International Search Report and Written Option for PCT/US2009/031018 dated Jul. 31, 2009.
Office Action dated Jun. 15, 2011 for U.S. Appl. No. 12/014,033.

* cited by examiner

*Primary Examiner* — Kishor Mayekar
(74) *Attorney, Agent, or Firm* — James P. Muraff; Neal, Gerber & Eisenberg LLP

(57) ABSTRACT

An ozone generator includes a housing with a plurality of openings and containing an ultraviolet lamp and a blower. A control is remotely connected to the housing for turning the generator on and off. The ultraviolet lamp emits ultraviolet radiation. The blower moves air into contact with radiation from the ultraviolet lamp. A modular arrangement of the invention includes components for assembling an ozone generator. The arrangement includes a first generator component and a second generator component connected by a hose. Another embodiment of a modular arrangement includes a generator and a blower connected by a hose. A method for operating an ozone generator includes placing an ozone generator in an unoccupied, enclosed space; placing a controller that is connected to the generator outside of the enclosed space; and turning on the controller.

6 Claims, 30 Drawing Sheets

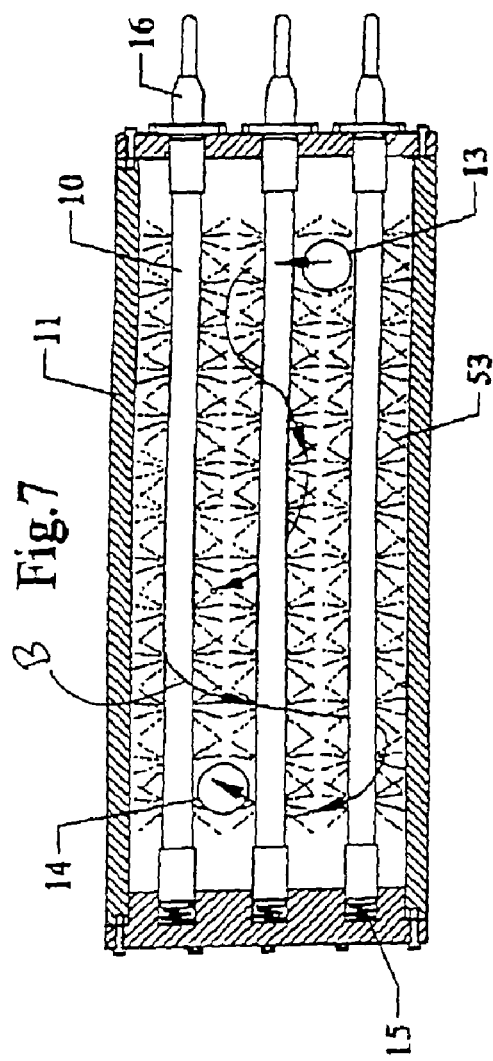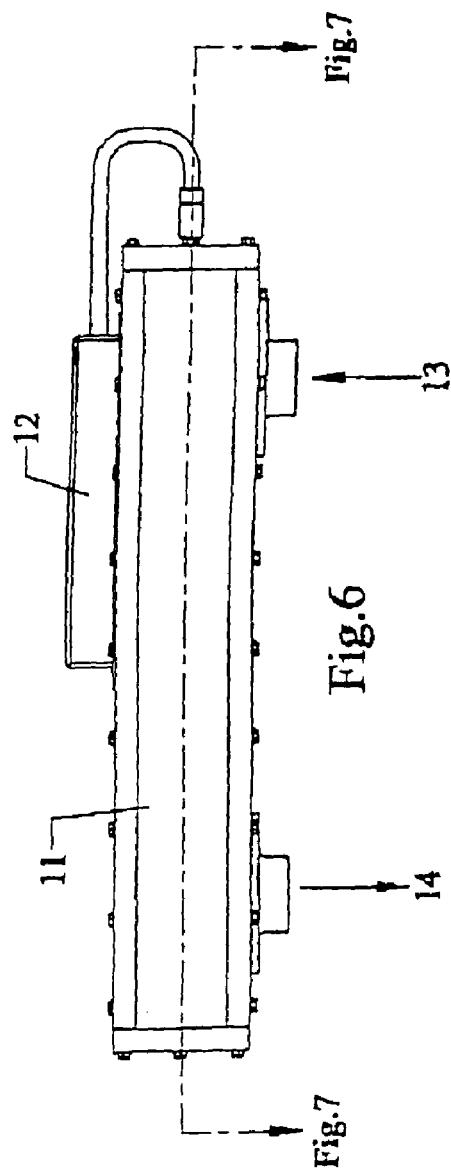

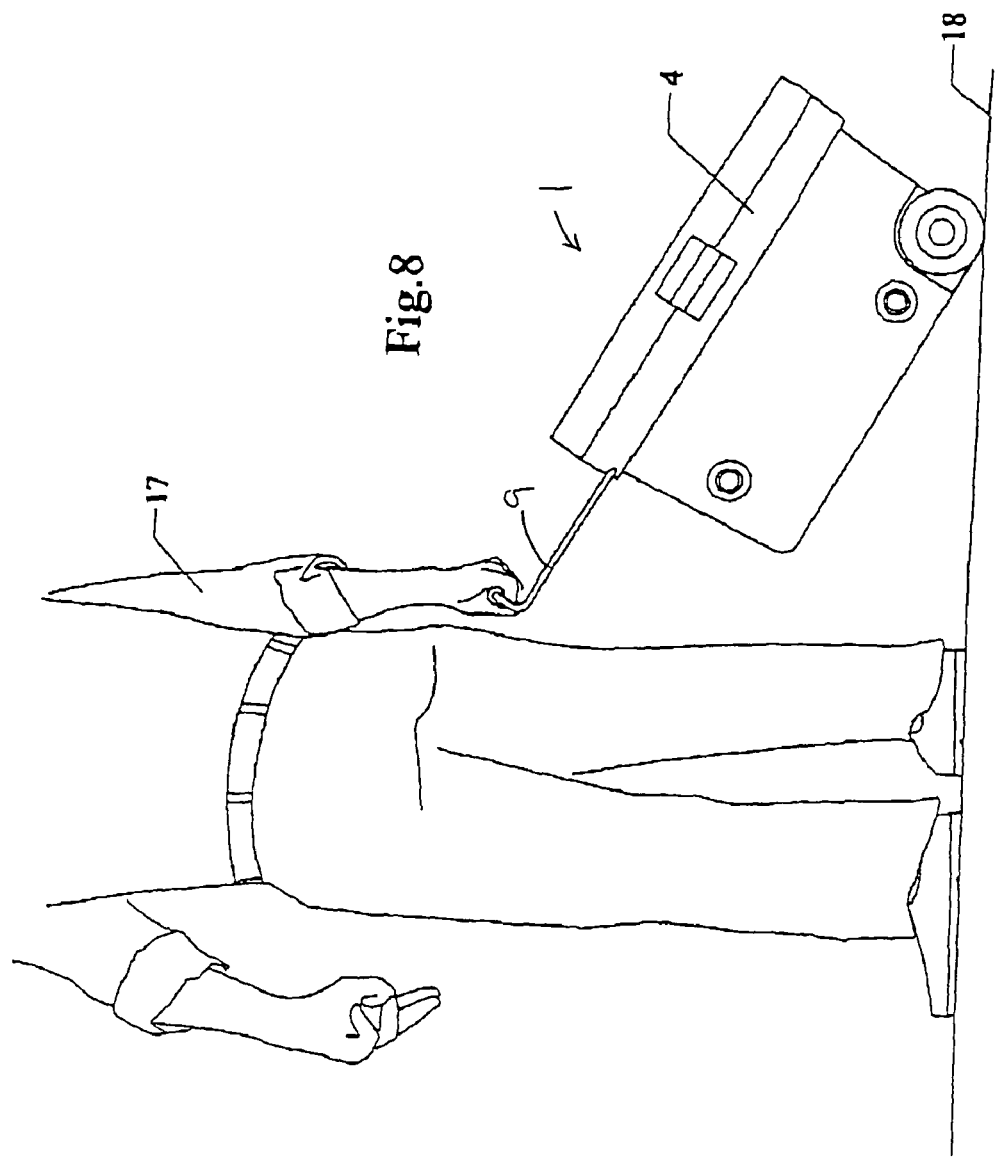

Fig.11
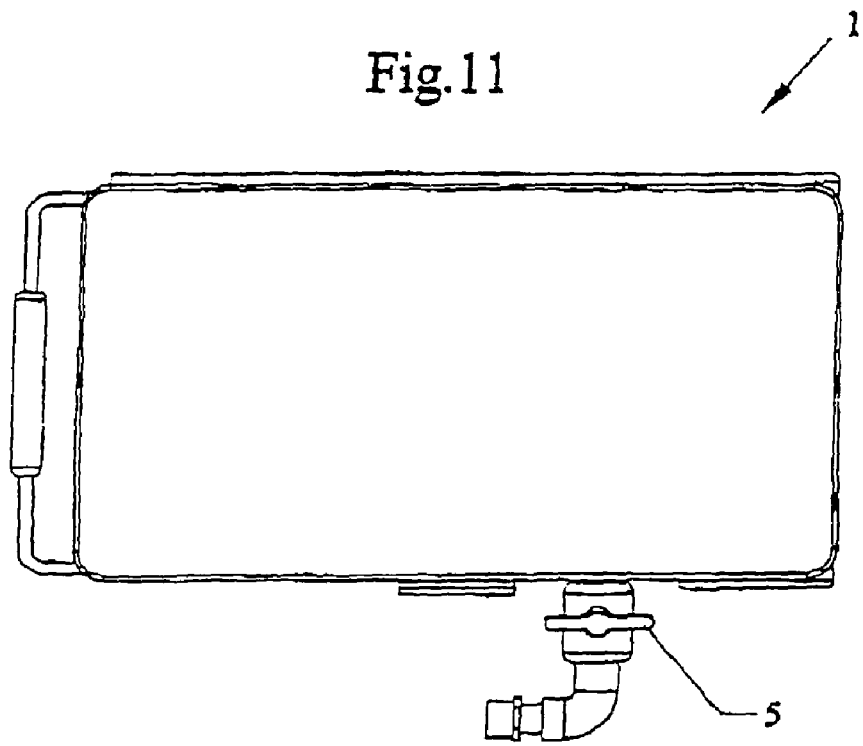
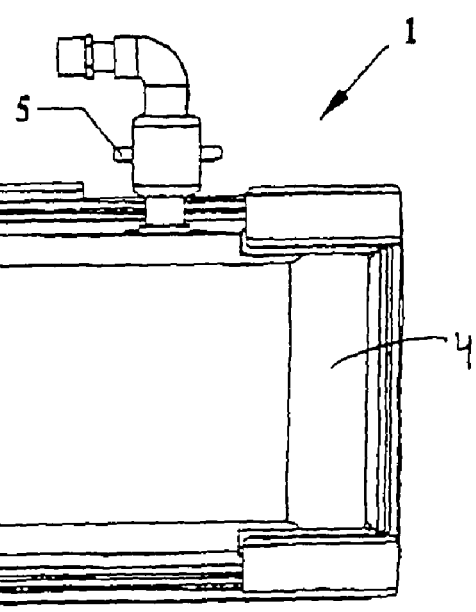
Fig.12

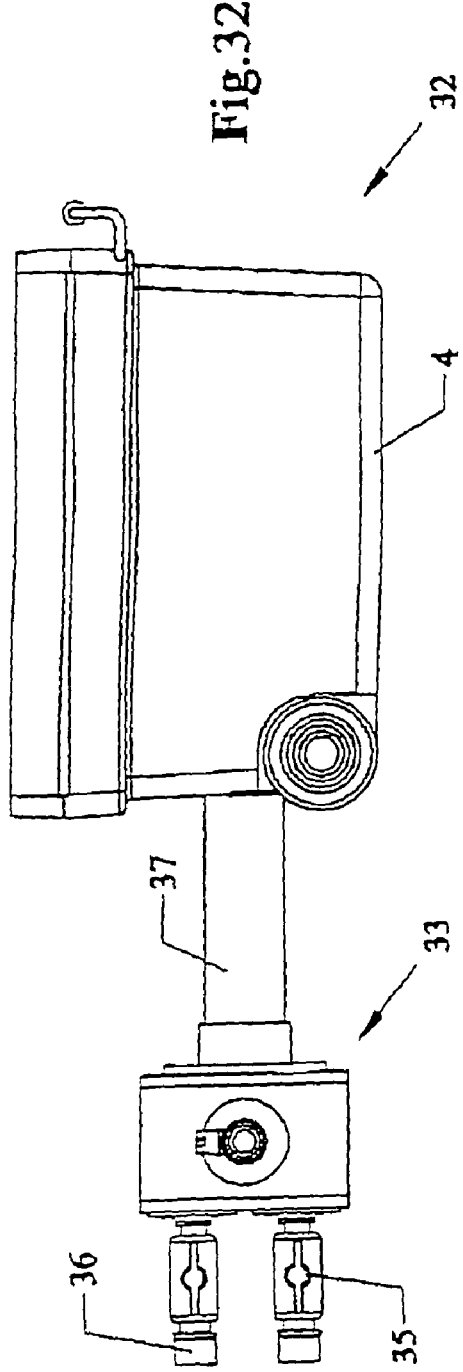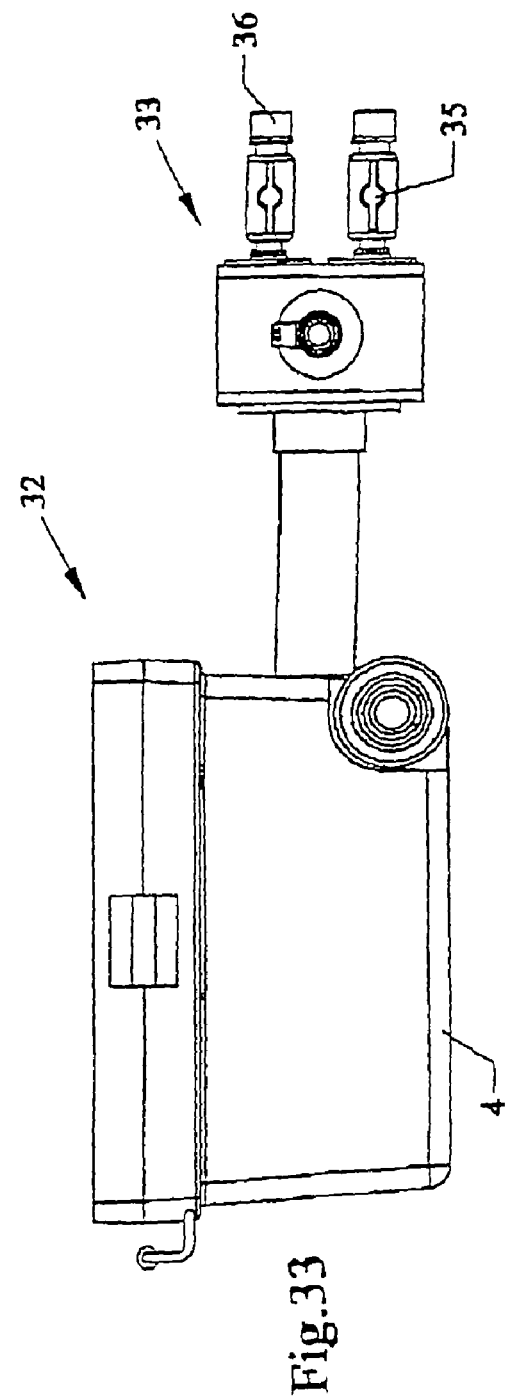

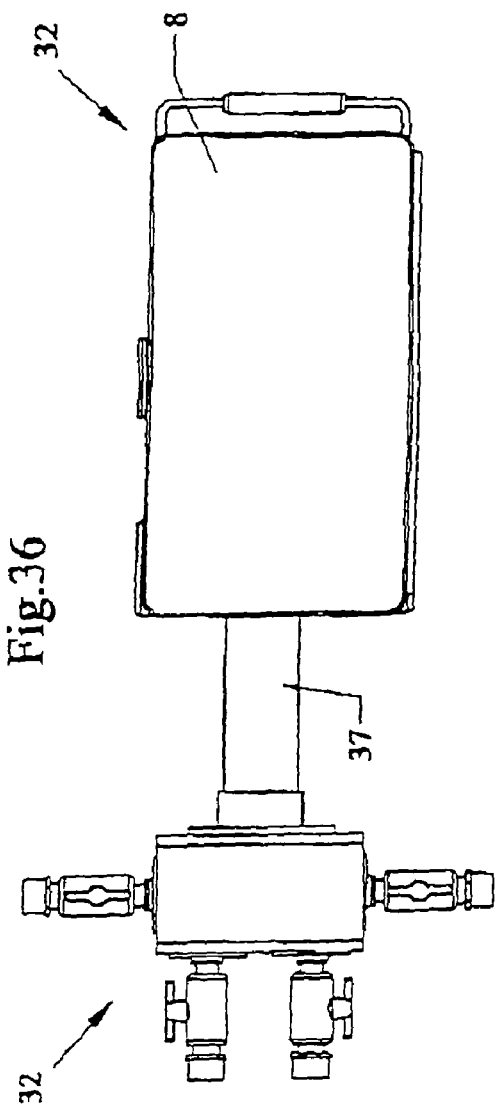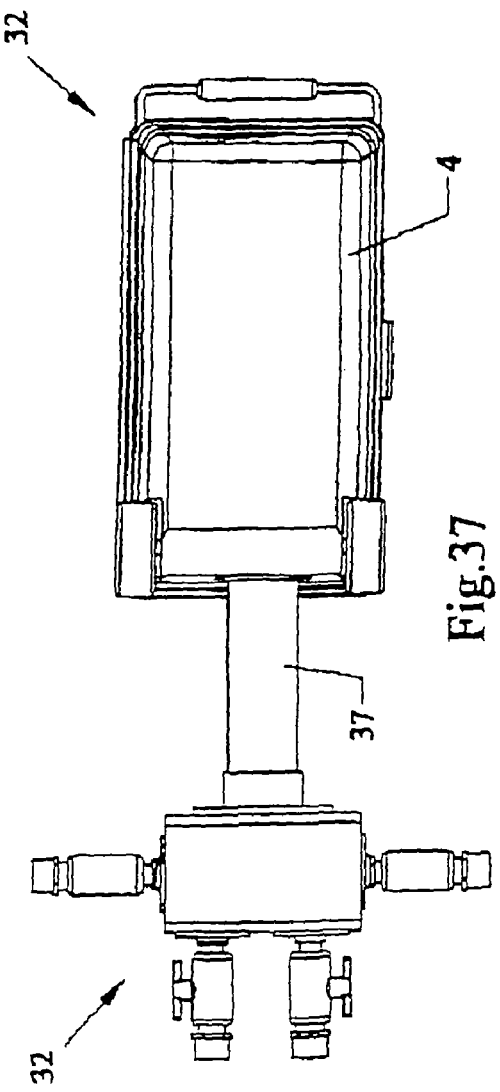

OZONE GENERATOR

RELATED APPLICATIONS

The present application claims the benefit of U.S. Provisional Application Ser. No. 60/683,258, filed May 20, 2005, the disclosure of which is incorporated herein by reference in its entirety

FIELD OF THE INVENTION

The present invention relates to apparatuses and methods for generating and using ozone for cleaning indoor air, purifying water, and killing mold, spores and other organisms on surface areas, and more specifically, to an apparatus, device and methods for generating high concentrations of ozone to clean indoor air, purify water, and kill mold and spores and organisms on surface areas in unoccupied spaces.

BACKGROUND

Ozone, chemically recognized as having three oxygen atoms per molecule, exists in the atmosphere as an unstable blue gas with a very characteristic odor that is easy to recognize. At levels below about 0.005 parts per million (ppm), ozone makes the air smell fresh and in concentrations of about 10 to about 20 ppm at higher altitudes, its color makes the sky blue. At altitudes from about 4 to about 6 miles above the earth, ozone is created from oxygen irradiated by a portion of the sun's ultraviolet spectrum and functions as a powerful absorber of harmful ultraviolet rays.

At ground level, ozone exists in a greatly diluted state and is always present in minute quantities of approximately 0.001 ppm to approximately 0.003 ppm, which we breathe in. It does not become an irritant until levels above about 0.1 ppm are exceeded for over about eight hours. Below those levels, there have not been any reports of permanent detrimental effects from inhaling it.

Ozone is created naturally, at ground level, by crashing surf, whitewater rapids, waterfalls and lightning storms. Ozone was discovered in 1840; the first ozone generators were developed by Werner von Siemens in 1857. For about 150 years, man has been able to generate ozone and has been relentless in finding ways to use ozone beneficially.

The first medical use of ozone was in 1870 to purify blood in test tubes. Other medical uses followed but not without controversy. Ozone has long been recognized as a very powerful oxidant and is used in over thirty different industries as an industrial oxidizer and sterilizer. Examples of some existing applications include, but are not limited to, manufacture of synthetic fibers, chemicals, jet lubricants, air scrubbing for clean rooms, treatment of industrial wastes, potable water treatment, bottling plants, sewage treatment, aquaculture, aquarium sanitation, food preservation, sterilization of containers, deodorization, pulpwood bleaching, and metal extraction.

While ozone is very powerful, it has a very short life span of approximately 20 minutes at ambient conditions. After completing its job, it reverts back to oxygen, as explained below. This means that ozone is usually produced on site. When in an area with contaminants such as odors, bacteria, or viruses, the extra atom of oxygen destroys them completely by oxidation. Ozone's most well known use is in water treatment as a primary stage disinfectant because of its bactericidal and virucidal efficacy. Different uses of ozone require different concentrations to obtain desired results.

Ozone generators have been widely used in the past decade for production of ozone as an indoor air cleansing agent. Machines that purposefully produce ozone are currently on the market for residential use. Above certain concentrations, ozone is a potent lung irritant that can cause respiratory distress, and levels of ozone that clean air effectively are unsafe to human health. Thus, in *State of Alaska Epidemiology Bulletin No.* 36, dated Sep. 8, 1997, "Ozone Generators—Warning—Not for Occupied Spaces," the Alaska Division of Public Health warns Alaskans not to use ozone generating devices in occupied spaces such as vehicles or residential homes.

The U.S. Food and Drug Administration prohibits devices that result in more than 0.050 ppm of ozone in the air of occupied enclosed spaces such as homes, offices, or vehicles, or that result in any releases of ozone in places occupied by the ill or infirm. The elderly, families with children, and people with respiratory diseases such as asthma are the most susceptible to the toxic effects of ozone, and are ironically among those most likely to be benefit from having cleaner indoor air.

Thus, there is a very delicate balancing act for providing ozone generators for indoor air cleansing at levels not considered harmful to desirable indoor life—plants, animals, and people. U.S. Pat. No. 5,681,533 to Hiromi describes an environment decontaminating system with an air cleaning and deodorizing function that controls the ozone concentration such that it remains lower than 0.06 ppm. U.S. Pat. No. 6,363,951 to Wood discloses an ozonation system that diffuses ozone into water used to wash foods, plates, utensils and the like, while a venting system or carbon filter is used to eliminate or destroy any ozone that escapes the water bath. Similarly, U.S. Pat. No. 6,872,366 describes a specially constructed chamber for ozone generation for disinfection of hands and forearms of health care providers. The exhaust outlet holes are covered by a fabric, such as wool, to neutralize ozone before it can escape to the environment surrounding the generator.

U.S. Pat. No. 6,589,486 to Spanton discloses an air purifying apparatus and method that is located in a forced air heating, ventilating, and air conditioning system that uses ultraviolet (UV) radiation to kill bacteria and viruses and ozone at a "safe and balanced" concentration of 0.2 to 0.3 ppm to destroy organisms not killed by the UV radiation.

There is also a contrary view of the use of ozone to clean indoor air in U.S. Pat. No. 6,494,934 to Fukushima describing a quick air cleaning and air sterilization system that avoids use of ozone because ozone is considered harmful and uncomfortable for persons.

There is a continuing need for effective ozone generators.

SUMMARY OF THE INVENTION

An ozone generator that provides extremely high concentrations of ozone is provided, and includes a housing with a plurality of openings and containing an ultraviolet lamp and a blower. A control is remotely connected to the housing for turning the generator on and off. The ultraviolet lamp emits ultraviolet radiation. The blower moves air into contact with radiation from the ultraviolet lamp. A modular arrangement of the invention includes components for assembling an ozone generator which provides even greater concentrations of ozone. The arrangement includes a first ozone generator component and at least one or more additional ozone generator components connected by a hose or plurality of hoses. Another embodiment of a modular arrangement includes an ozone generator and a blower connected by a hose. A method for operating an ozone generator includes placing an ozone generator in an unoccupied, enclosed space; placing a controller that is connected to the ozone generator outside of the enclosed space; and turning on the controller.

Further advantages of this invention will be apparent from the following detailed description of the exemplary embodiments which are illustrated schematically in the accompanying drawings.

BRIEF DESCRIPTION OF THE FIGURES

FIG. 6 is a top view of one embodiment of an ultraviolet lamp housing.

FIG. 7 is a cross-sectional side elevation view of the housing of FIG. 6 having three UV bulbs, showing airflow through the housing.

FIG. 8 is a right side elevation illustration showing the portability of the generator of FIGS. 4 and 5.

FIG. 11 is a top view of the generator of FIGS. 4 and 5.

FIG. 12 is a bottom view of the generator of FIGS. 4 and 5.

FIG. 32 is a left side elevation view of the embodiment of FIG. 27.

FIG. 33 is a right side elevation view of the embodiment of FIG. 27.

FIG. 36 is a top view of the embodiment of FIG. 27.

FIG. 37 is a bottom view of the embodiment of FIG. 27.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A portable ozone generator, system, device and method are provided to effectively eliminate high concentrations of airborne contaminants, such as bacteria, viruses, mold, mildew and odors. Significantly, embodiments of the ozone generator of the present invention generate ozone at levels greater than about 70 parts per million through an ultraviolet process. It is contemplated that the present invention is ideally used in unoccupied enclosed spaces.

An ozone generation system of the present invention can consist of modular units, such as blowers, auxiliary ultraviolet lamp assemblies, or stand-alone ozone generators connected to appropriate modular units to increase the concentration of ozone or to expand the simultaneous delivery of ozone to several locations. The modular units make it easy for one person to transport, assemble and operate the ozone generator on site. With reference to the drawings, FIGS. 1-15 show an embodiment of the present invention as a stand alone, efficient, portable ozone generator housed in one unit and preferably weighing less than approximately twenty pounds.

Figure 1:
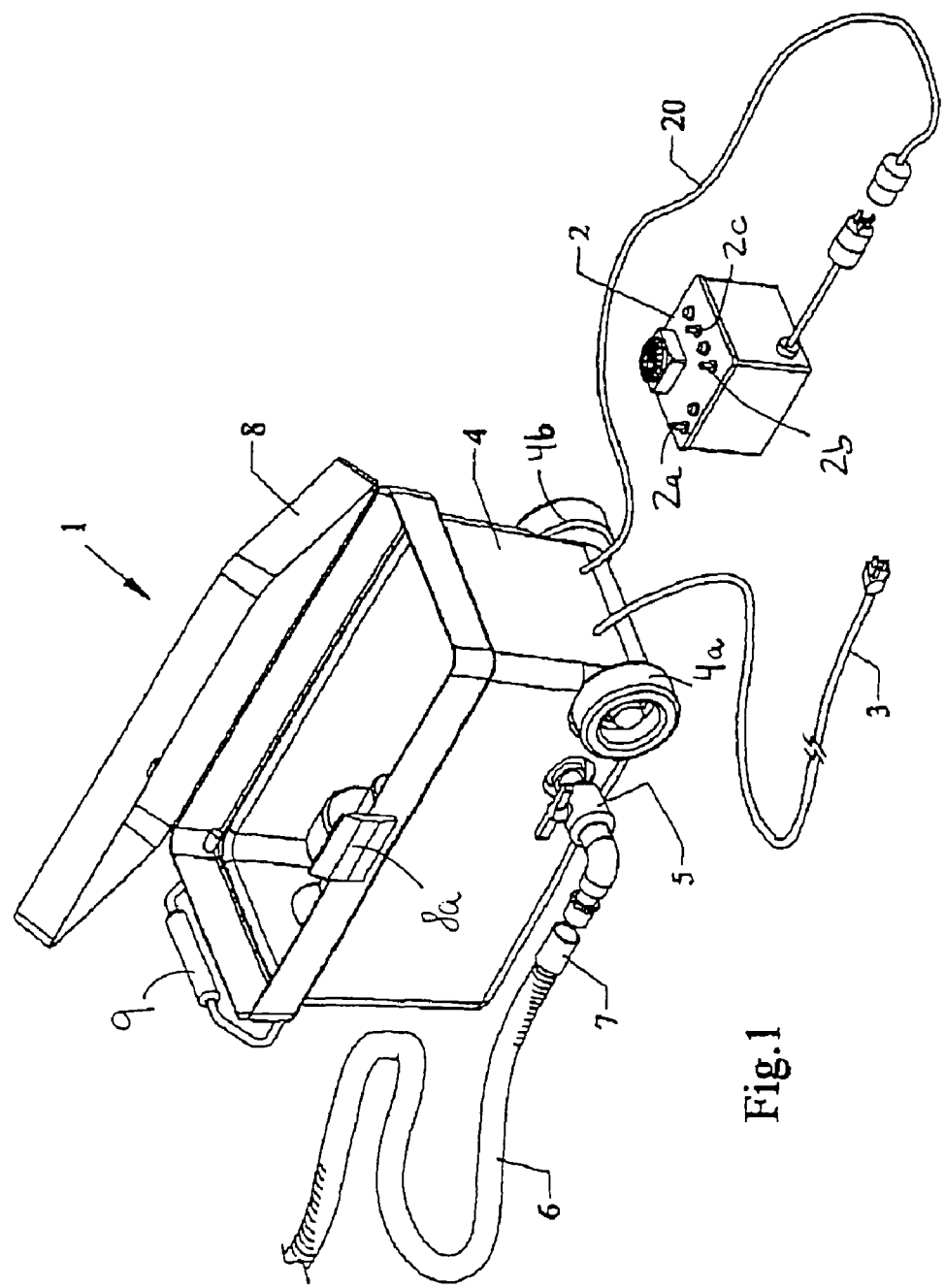
FIG. 1 is a rear right perspective view of one embodiment of a portable ozone generator with an open lid.

FIG. 1 shows one embodiment of a portable ozone generator of the present invention. In an exemplary embodiment, generator 1 is a portable ozone generator unit having a rectangular shaped housing 4 with wheels 4a and 4b and hinged lid 8. While wheels 4a and 4b are illustrated, it is also contemplated that other known mobility-enhancing devices, such as casters, can also be used. In an exemplary embodiment, housing 4 is made of a rugged, durable plastic copolymer, such as polypropylene, which will not wear out or deteriorate during exposure to ultraviolet (UV) light. A latch 8a securely closes the hinged lid 8 and an extendable handle 9 on the front end of the rectangular shaped compartment can be pulled forward to facilitate lifting and transporting generator 1 and other attachments as easily as one would transport luggage on wheels. Alternatively, a fixed handle could be used. Housing 4 for generator 1 can be a tool box such as the MASTER MATE™ distributed by The Black & Decker Corporation or the present invention could be contained in a similar durable tool box from another supplier.

FIG. 1 also shows a power cord 3 extending from the rear of housing 4 and a cable connection 20 for connecting a control or timer/controller unit 2. Power cord 3 and cable connection 20 are attached to the ozone generator through respective openings in housing 4. Housing 4 also has a plurality of other openings, including inlets and outlets for fluids such as air and ozone. In one embodiment, control 2 has toggle switches 2a, 2b and 2c. Although toggle switches are used to exemplify the invention, the skilled artisan is well aware that other types of switches known in the art could be substituted without altering the invention. While cable connection 20 is shown, it is contemplated that a wireless remote control can also be used. In one embodiment, control 2 is remotely connected to housing 4, meaning that control 2 is positioned outside of the enclosed space being treated. Shutoff valve 5 for outbound ozone can be fitted with a hose 6 having a hose fitting 7 that fits snugly onto valve 5.

Figure 2:
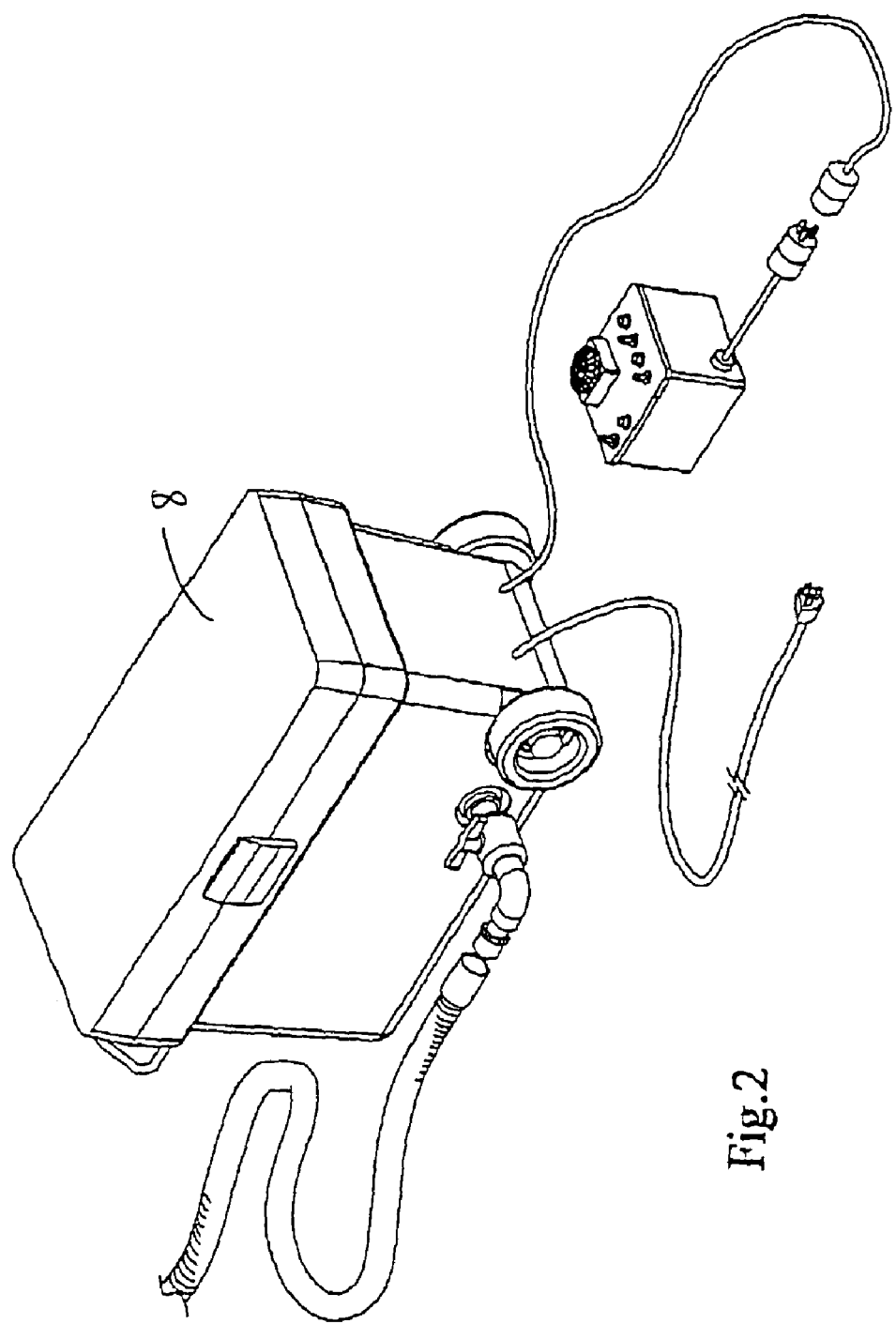
FIG. 2 is a rear right perspective view of the generator of FIG. 1 with a closed lid.
Figure 3:
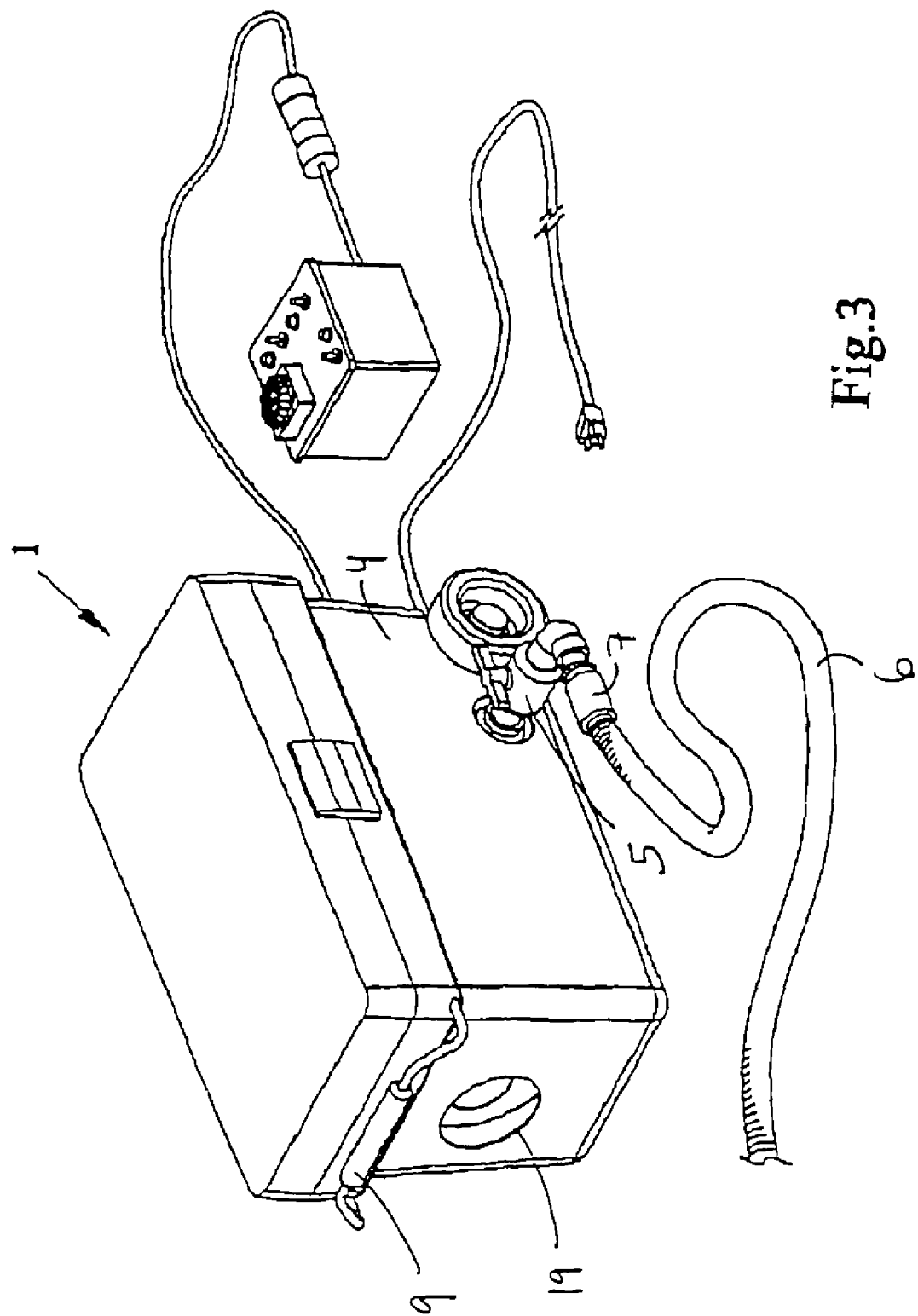
FIG. 3 is a front right perspective view of the generator of FIG. 2.

FIG. 2 has all of the elements of FIG. 1 and shows generator 1 with hinged lid 8 in a closed position. FIG. 3 shows connections on the latch side of housing 4 wherein the shutoff valve 5 is connected to hose 6 with the secure hose fitting 7. On the front side of housing 4 is an air intake opening 19 centrally located below the extendable handle 9.

Figure 4:
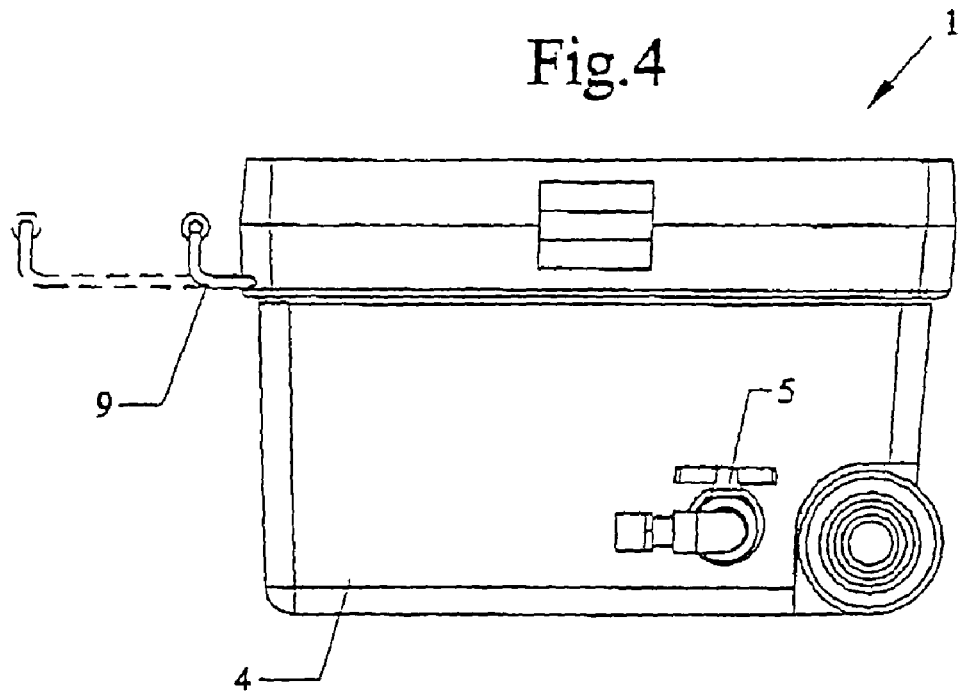
FIG. 4 is a right side elevation view of the generator of FIG. 2 without hose connections.

FIG. 4 provides a view of the right side of generator 1 with shutoff valve 5 for outbound ozone positioned in a lower, rear section of housing 4. The extendable function of handle 9 is also illustrated in FIG. 4.

Figure 5:
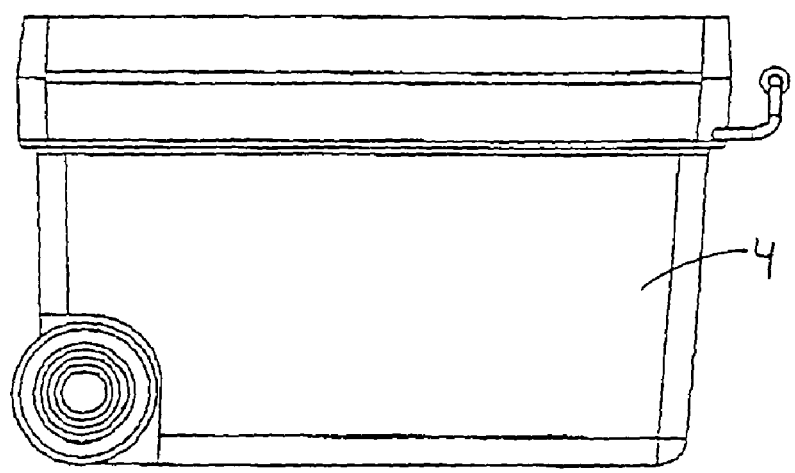
FIG. 5 is a left side elevation view of the generator of FIG. 2 without hose connections.

FIG. 5 provides a view of the left side of generator 1 with no openings or valves, thus providing a very simple housing structure. In one embodiment, housing 4 is approximately 24 inches long, approximately 16 inches high and approximately 14 inches wide. However, a person skilled in the art would easily recognize other sizes and configurations for the unit housing and the present invention is not limited to any specific dimensions.

FIG. 6 is a top view of one embodiment of an ultra violet (UV) lamp housing 11. When viewed from the top, lamp housing 11 consists of a one-piece plastic cover with lamp ballast 12 that provides the power for the UV lamps contained within housing 11. On a side opposite the lamp ballast 12 are two openings: lamp housing air intake opening 13 toward the rear end of the housing 11 and a lamp housing ozone exhaust opening 14 toward the front of the lamp housing 11.

FIG. 7 is a cross-sectional side elevation view of housing 11 of FIG. 6 taken along the indicated line. In an exemplary embodiment, a series of three ultraviolet lamps 10, each of which emits ultraviolet radiation, is positioned within the walls of the housing 11. The arrangement and spacing of UV lamps is such that there is approximately one inch between housing 11 and lamp 10 at the top and approximately one inch between housing 11 and lamp 10 at the bottom; the space between each lamp 10 is approximately two inches. The two inch spacing accommodates air intake opening 13 at the rear end of lamp housing 11 and ozone exhaust opening 14 at the front of housing 11. Also shown in FIG. 7 are lamp connectors 16 attached to each UV lamp 10 and connected to lamp ballast 12 shown in FIG. 6. At the front end of each lamp 10 is a lamp preload spring 15 that acts as a shock absorber, thereby inhibiting lamp 10 from being damaged or forming a loose connection in housing 11.

A pattern of airflow is shown by arrows B. The resultant emanation of ozone is shown by the patterned lines 53. When generator 1 is in operation, air enters through air intake opening 13 and moves as shown by arrows B from the rear end of lamp housing 11 towards the front of lamp housing 11. The air is thus exposed to radiation from ultraviolet lamps 10; the oxygen in the air is thereby converted to ozone during the exposure to UV lamps 10, and the ozone gas exits ozone exhaust opening 14.

FIG. 8 shows a person 17 holding the extendable handle 9 to move generator 1 in housing 4 along a floor 18 or similar surface.

Figure 9:
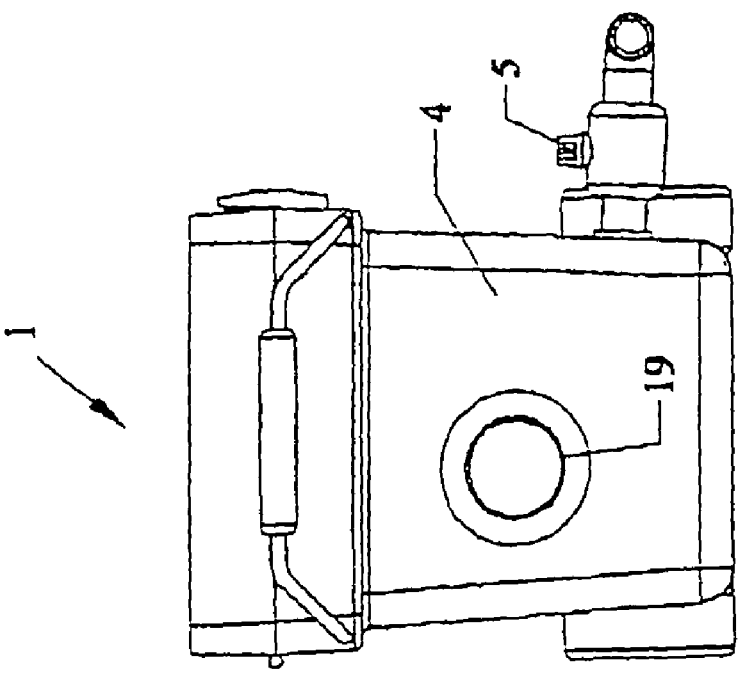
FIG. 9 is front elevation view of the generator of FIGS. 4 and 5.

FIG. 9 is a front elevation view of generator 1 showing housing 4 with air intake opening 19. In an exemplary embodiment, opening 19 is a circular orifice that is approximately 4½ inches in diameter. Air from the enclosed space to be treated enters the intake opening 19 in housing 4; enters lamp housing 11; is converted to ozone gas by the series of UV lamps 10; and exits lamp housing 11 where the release of ozone to the exterior of housing 4 is controlled by shutoff valve 5 for outbound ozone.

Figure 10:
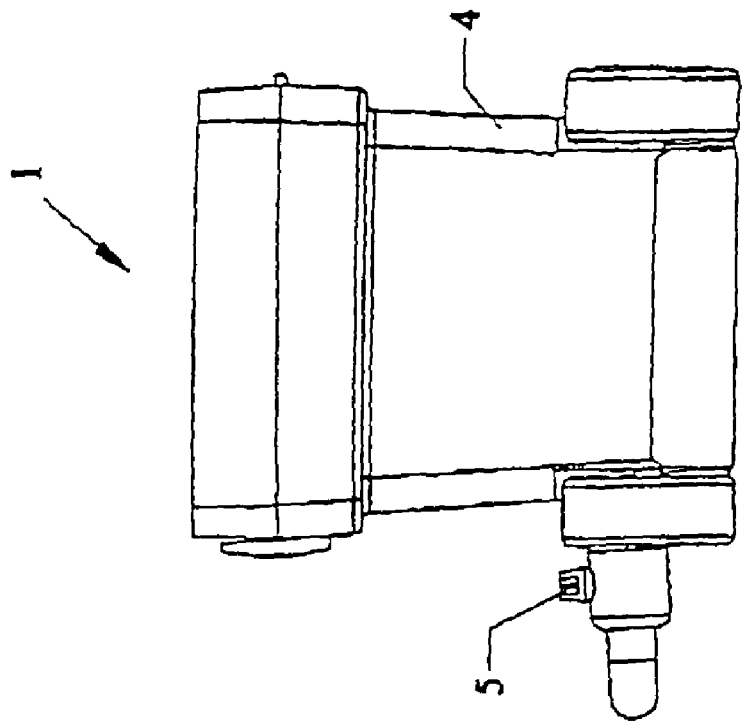
FIG. 10 is a rear elevation view of the generator of FIGS. 4 and 5.

FIG. 10 is a rear elevation view of generator 1 showing housing 4 and shutoff valve 5 for outbound ozone.

FIG. 11 is a top view of generator 1 with a view of the top and handle of shutoff valve 5. FIG. 12 shows the bottom side of generator 1 with shutoff valve 5 extending outward from an area near the bottom rear section of housing 4.

Figure 13:
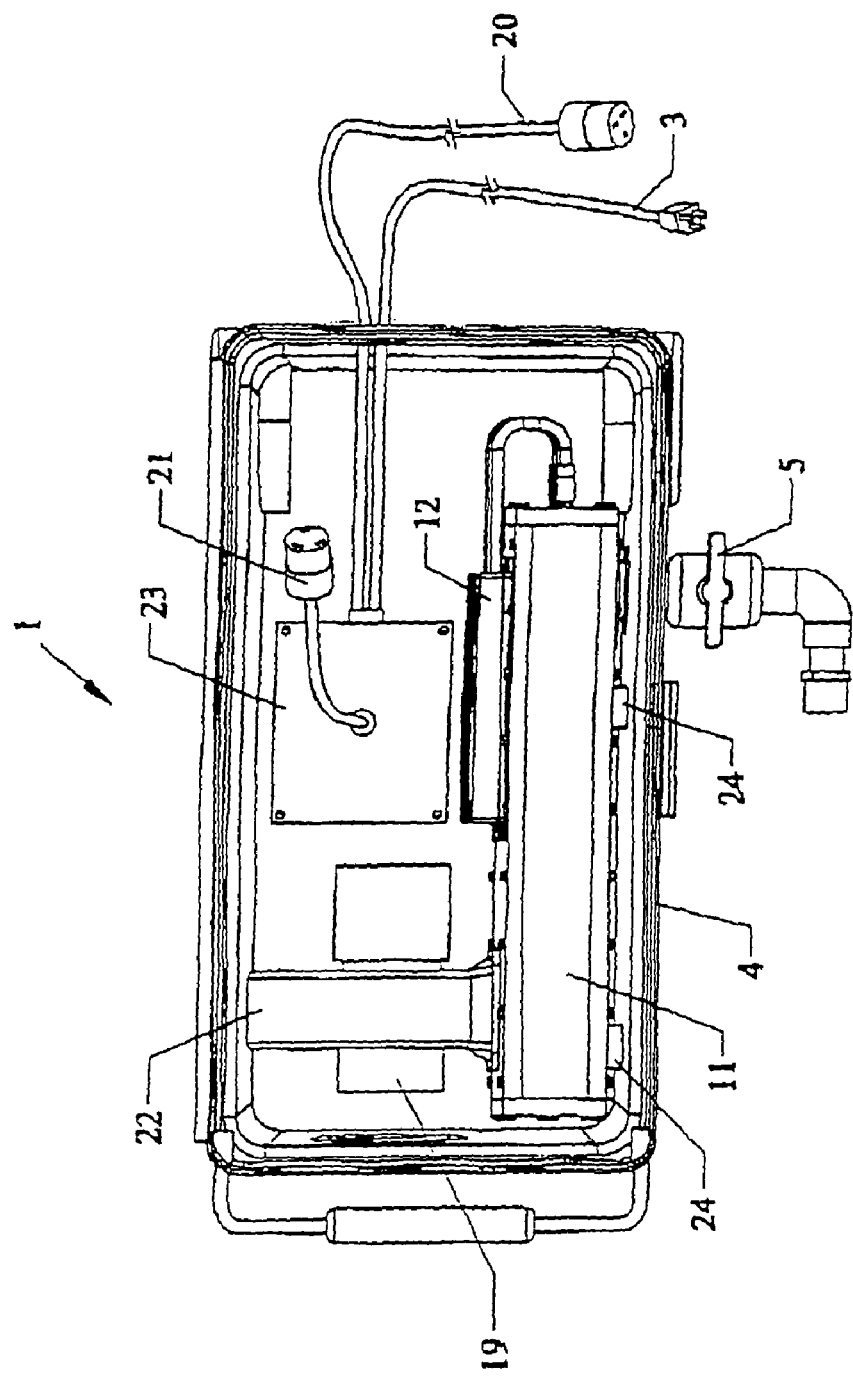
FIG. 13 is a top view of the generator of FIG. 3 with the lid off, showing interior details.

FIG. 13 shows the interior detail of components of generator 1 with lid 8 removed. Fan or blower unit 22 pulls air into generator 1 through air intake opening 19. An exemplary blower is one that is quiet and capable of moving 100 cubic feet of air per minute (100 cfm); an example of a blower suitable for use in the present invention is manufactured by ITT Jabsco, Model No. 34744. Positioned behind blower unit 22 is wiring box 23, containing a connector 21 to an auxiliary lamp housing assembly, a connection for timer/controller cable 20 and a power cord 3. The latch side of generator housing 14 contains ultraviolet lamp housing 11 with lamp ballast 12 and shutoff valve 5 towards the rear of generator 1. A plurality of lamp housing mounting bumpers 24 are used to secure lamp housing 11 and protect it from unnecessary movement or jarring forces that could shorten the life of UV lamps 10 in the assembly.

Figure 14:
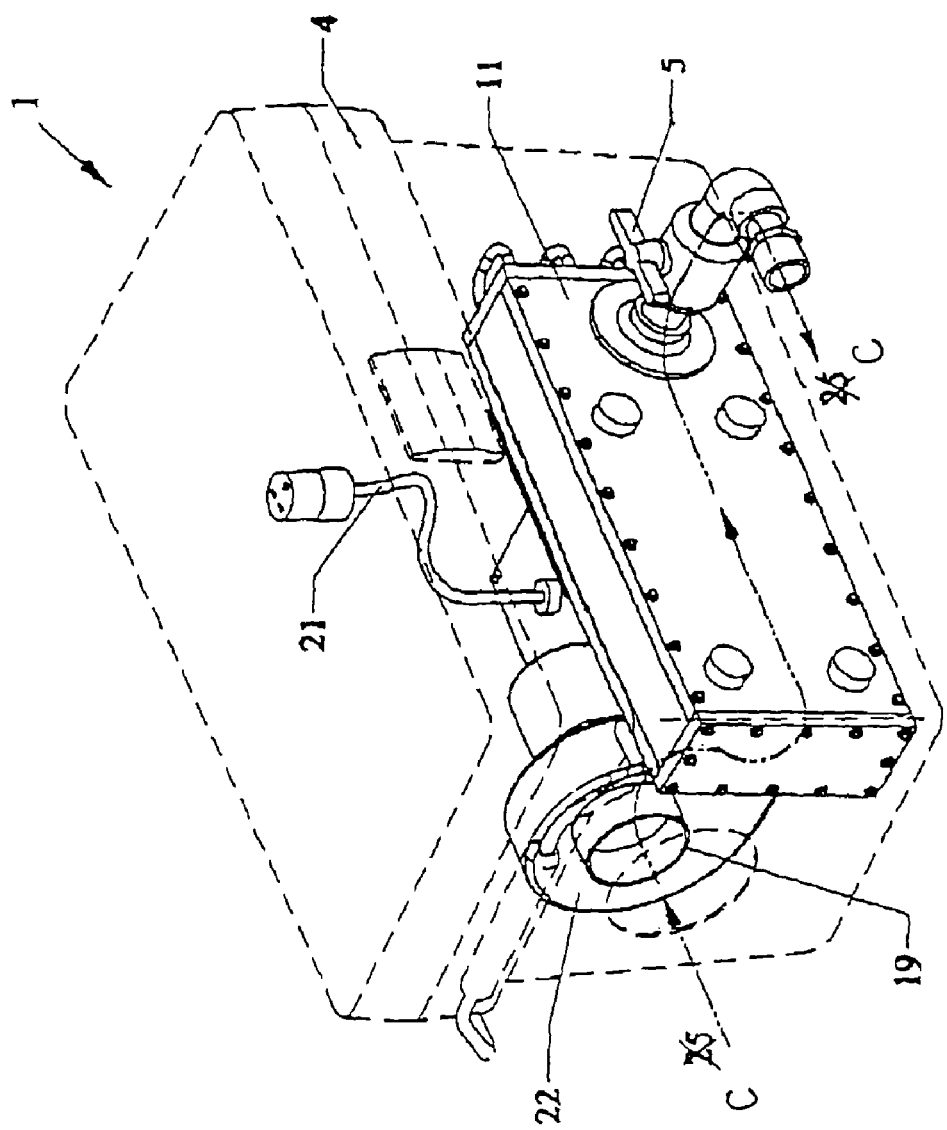
FIG. 14 is a front right perspective view of the generator of FIG. 3 with ghosted housing.

FIG. 14 is a front right perspective view of generator 1 with housing 4 ghosted. At the front, air intake opening 19 connects to blower unit 22. Air flowing into generator 1 is represented by arrow C. When generator 1 is operating, air flows through UV lamp housing 11, where ozone is produced. When shutoff valve 5 is opened, air having an increased ozone content is released. Connector 21 for an auxiliary lamp housing assembly is available to increase ozone generation in a modular attachment.

Figure 15:
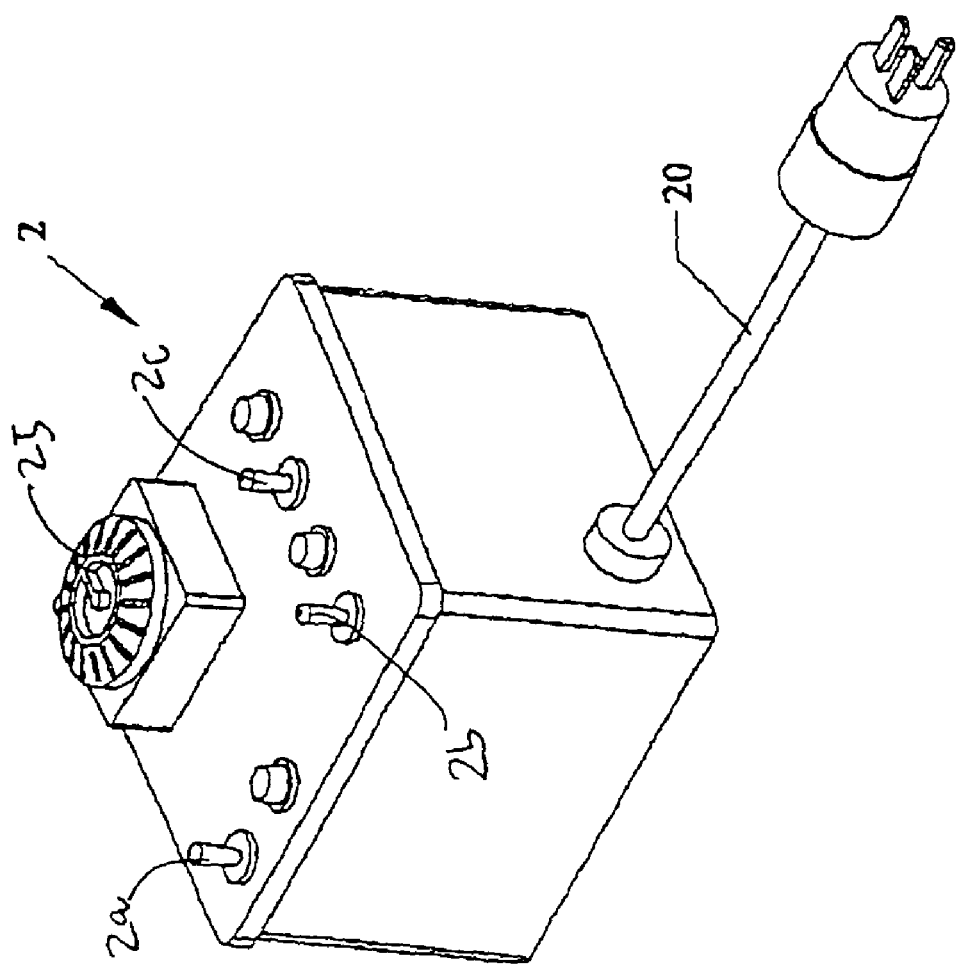
FIG. 15 is an enlarged perspective drawing of one embodiment of a timer/controller unit.

Control 2 can be used to control operation of generator 1 by directly switching on or off blower 22, ultraviolet lamps 10, or other components, as desired. For example, FIG. 15 shows timer/controller unit 2 which is configured with clock 25 that can be set for starting and stopping the operation of generator 1 from a remote location. Each of three toggle switches 2a, 2b, 2c corresponds to an electrical connection in the wiring box and is positioned next to a light which indicates when the switch is turned on or off. In one example, first toggle switch 2a turns on blower 22, second toggle switch 2b controls UV lamps 10, and third toggle switch 2c controls a timer in unit 2. Timer/controller cable and connector 20 is used to connect timer/controller unit 2 to generator 1. A single timer/controller unit 2 can be used with generator 1 and can also be attached to additional modular generator 1 units as the source of power and control.

FIGS. 16-26 describe a second embodiment of a portable ozone generator. Auxiliary ultraviolet (UV) lamp box assembly module 26 can be used as a separate modular unit together with other modular units containing a blower or a plurality of blower units, to provide a portable ozone generator. Multiple modules 26 can be used to increase ozone concentration in a single enclosed area or to increase ozone production for distribution to more than one location or enclosed area. The use of modules 26 also facilitates the portability and versatility of the present invention. For example, each module can be configured to weigh less than about 25 pounds and can be contained in housing 4 with wheels for ease of transport from point to point. In one embodiment, housing 4 for each module is rectangular and can be easily stacked and stored. The use of one or more auxiliary lamp box assembly modules 26 together with one or more stand-alone portable ozone generators 1 allows for the provision of higher concentrations of ozone (shown in FIG. 41).

In one application embodiment, modular lamp housing assemblies 26 or stand-alone ozone generator 1 can be mounted on a wall. Appropriate hoses can extend to various rooms and locations within a structure such as a night club or restaurant. Such places typically have a frequent need for cleaning of the indoor air because of smoke, odors and other airborne contaminants.

Figure 16:
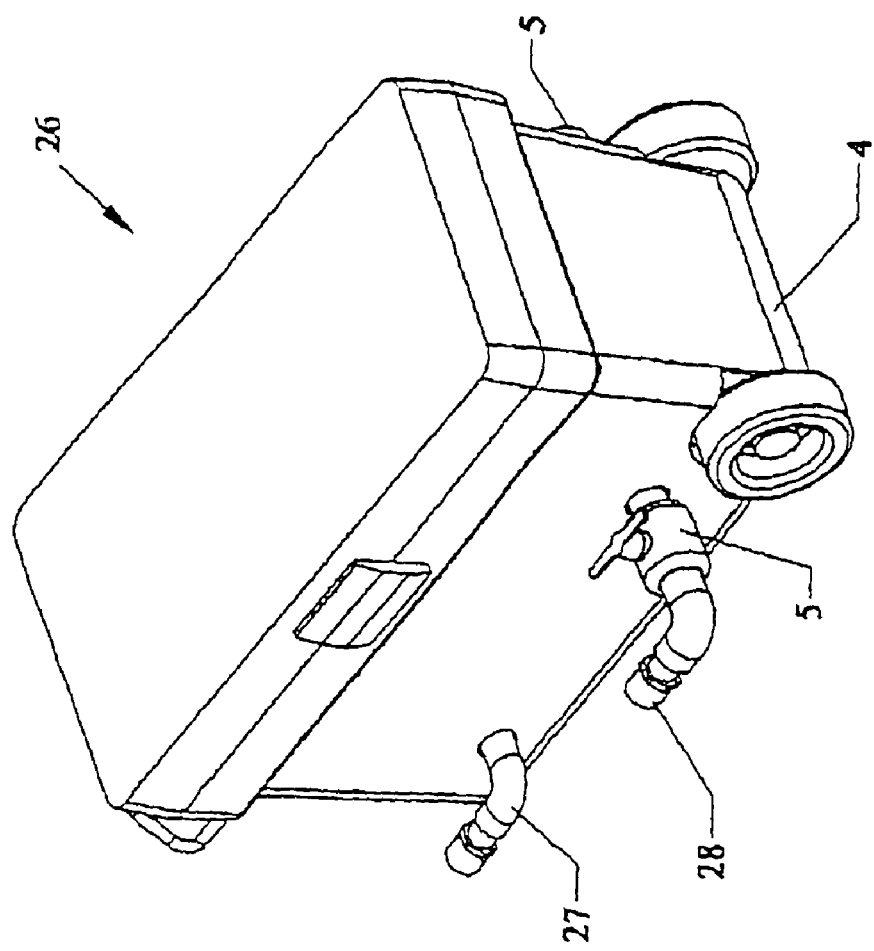
FIG. 16 is a rear right perspective view of a second embodiment of a portable ozone generator.

FIG. 16 is a right rear perspective view of auxiliary lamp box assembly 26 with two lamp housings 11 per box 26 and a series of three ultraviolet lamps 10 positioned within each housing 11. External housing 4 of lamp box assembly 26 has side openings to accommodate air intake fittings 27 and two shutoff valves 5 for outbound ozone; each shutoff valve has exhaust fitting 28.

Figure 17:
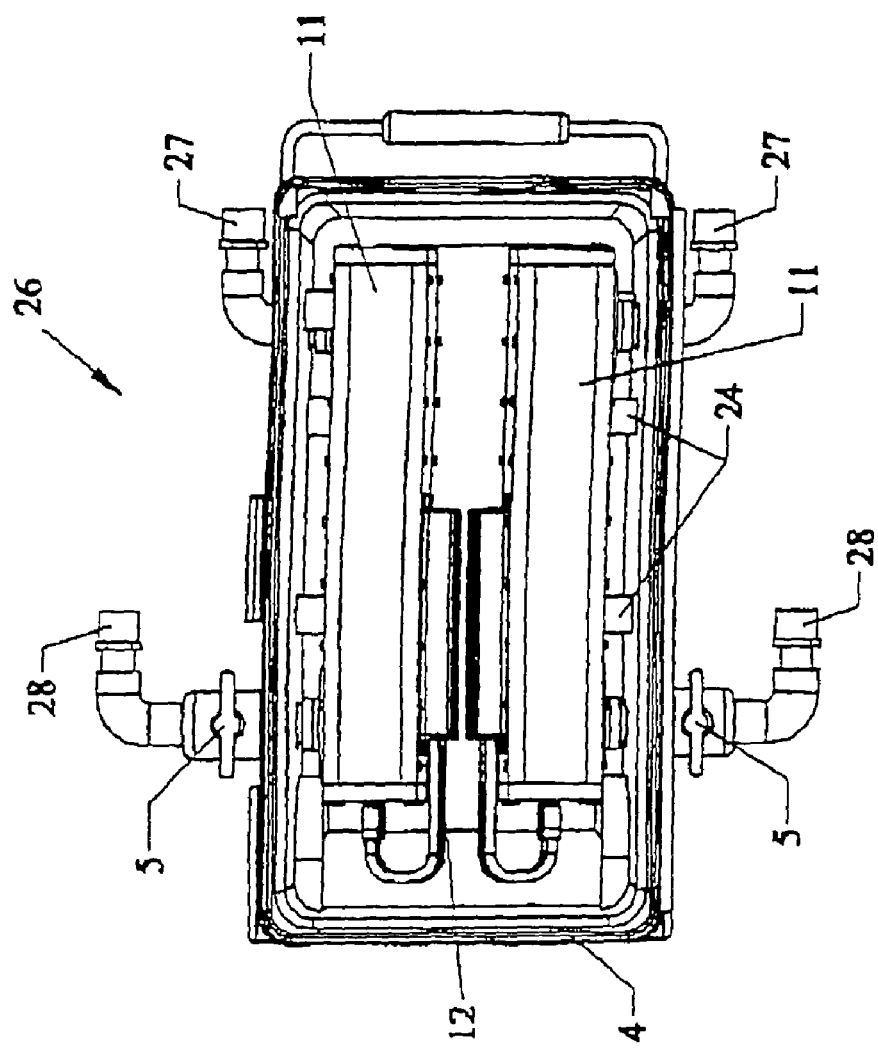
FIG. 17 is a top view of the generator of FIG. 16 with the lid and protective shelf removed to show the interior details.

FIG. 17 is a top view of an auxiliary lamp box assembly 26 with housing lid 8 and a protective shelf removed to expose the interior configuration within housing 4. Housing 4 contains two lamp housings 11 arranged in parallel alignment with lamp ballasts 12 facing each other in a central area of housing 4. Lamp housing mounting bumpers 24 are positioned between the lamp housings 11 and the outer walls of housing 4 to stabilize the position of the UV lamps (not shown). Connections between lamp housings 11 and external openings in housing 4 include openings for shut-off valves 5 with exhaust fittings 28 toward the rear section of housing 4. Toward the front section of housing 4 there are external openings for air intakes 27. Auxiliary lamp housing assembly 26 can be constructed as a separate module which is connected to a blower assembly for moving air into lamp housings 11; with two lamp assemblies, a greater amount of ozone can be produced for release into the air when the shut-off valves 5 are opened.

Figure 18:
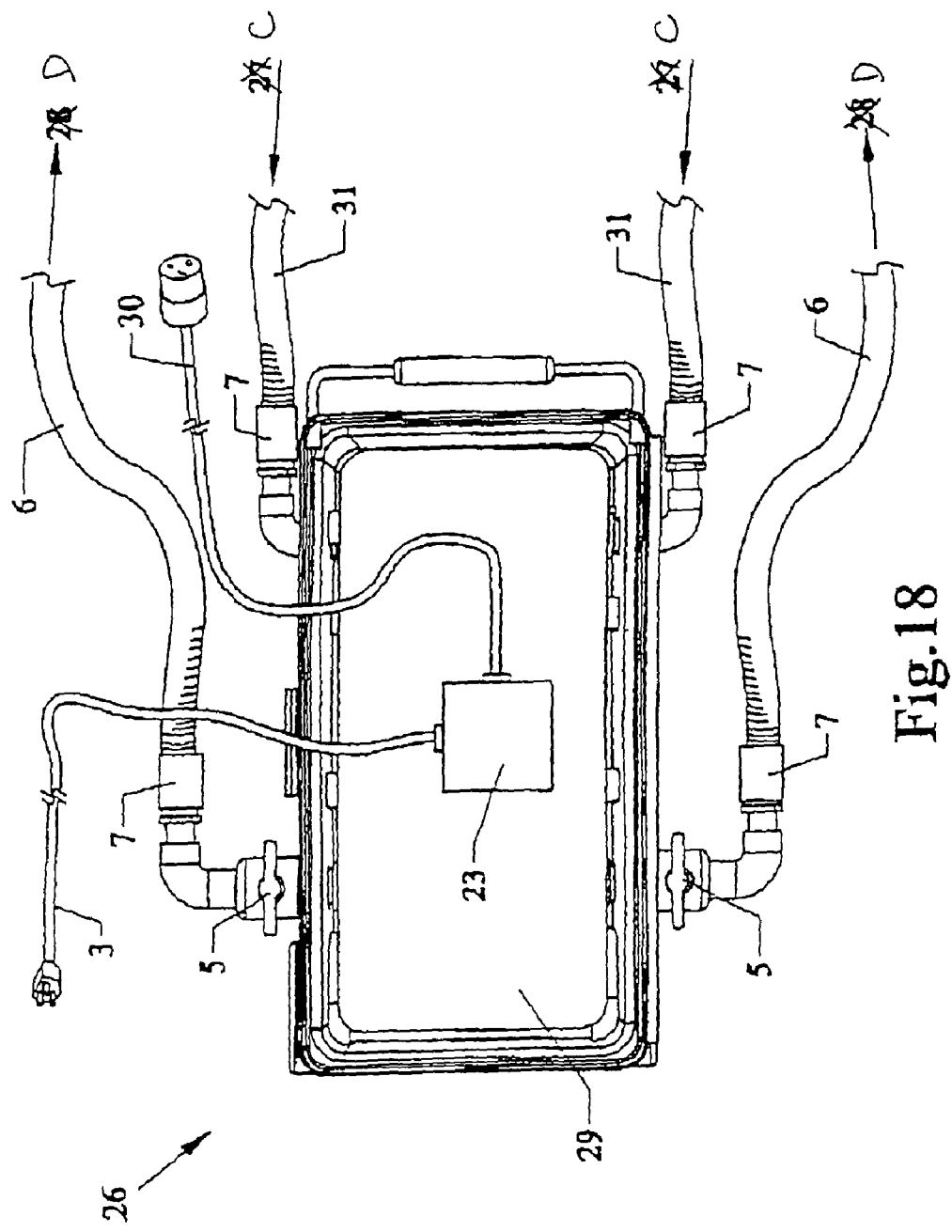
FIG. 18 is a top view of the generator of FIG. 16 with one embodiment of a protective shelf, the generator being connected for operation.

FIG. 18 is a top view of auxiliary lamp box assembly 26 of FIG. 17 with protective shelf 29 in place and auxiliary lamp box assembly 26 in an operable position. Wiring box 23 includes power cord 3 and controller cable 30. Hose couplings 7 connect air distribution hoses 31 to air intake C; hose couplings 7 also connect air distribution hoses 6 for outbound ozone D.

Figure 19:
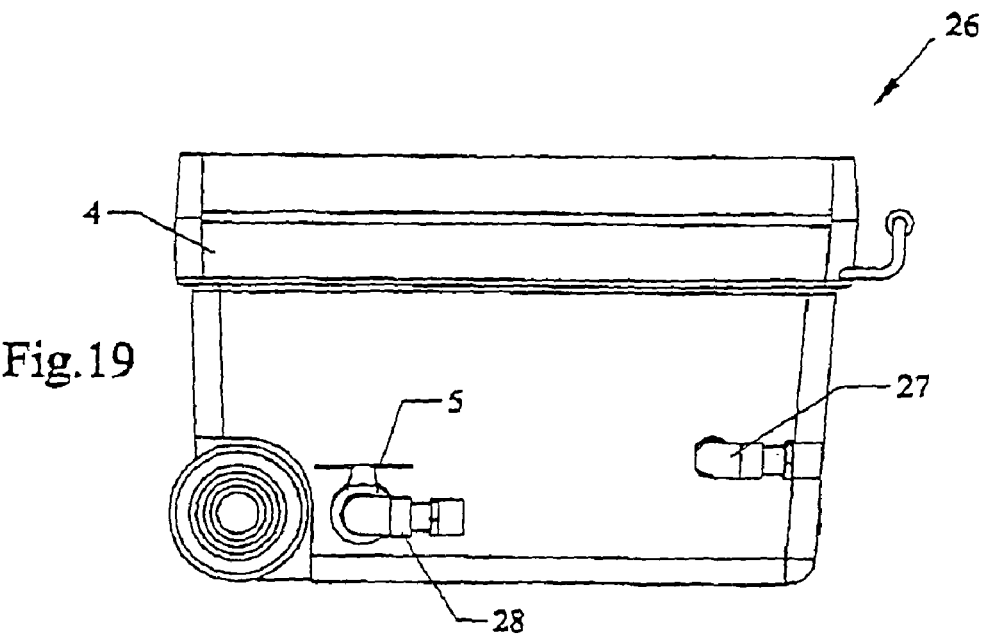
FIG. 19 is a left side elevation view of the generator of FIG. 16.
Figure 20:
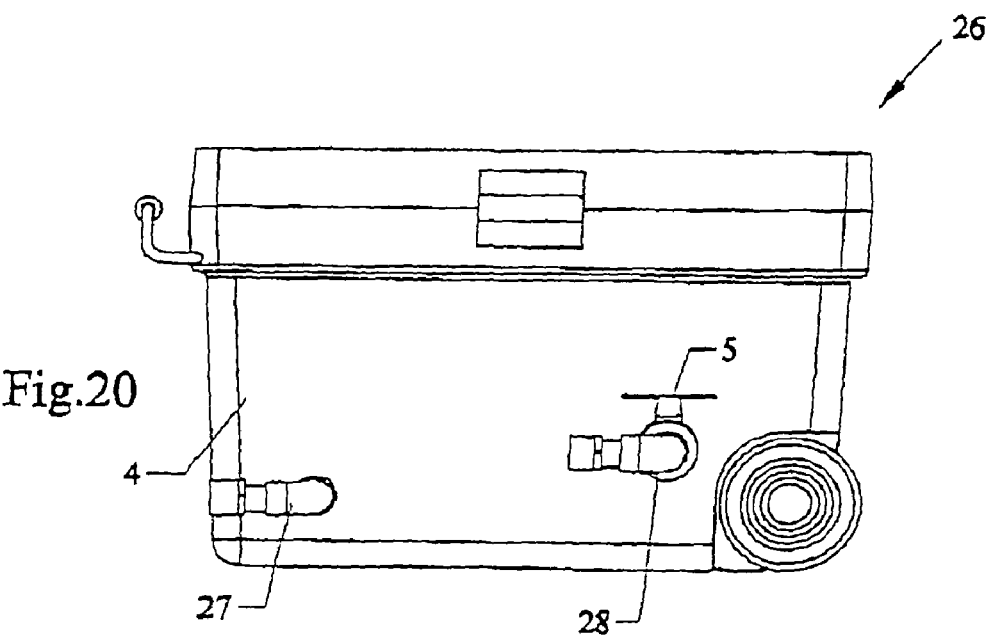
FIG. 20 is a right side elevation view of the generator of FIG. 16.

FIG. 19 is an external elevation view of the left side of auxiliary lamp box assembly 26 and FIG. 20 is an external elevation view of the right side of the same assembly 26. Both sides have openings for a shut-off valve 5 with an exhaust fitting 28 in a lower rear section of housing 4 and openings in the forward end of the housing 4 for air intake 27.

Figure 21:
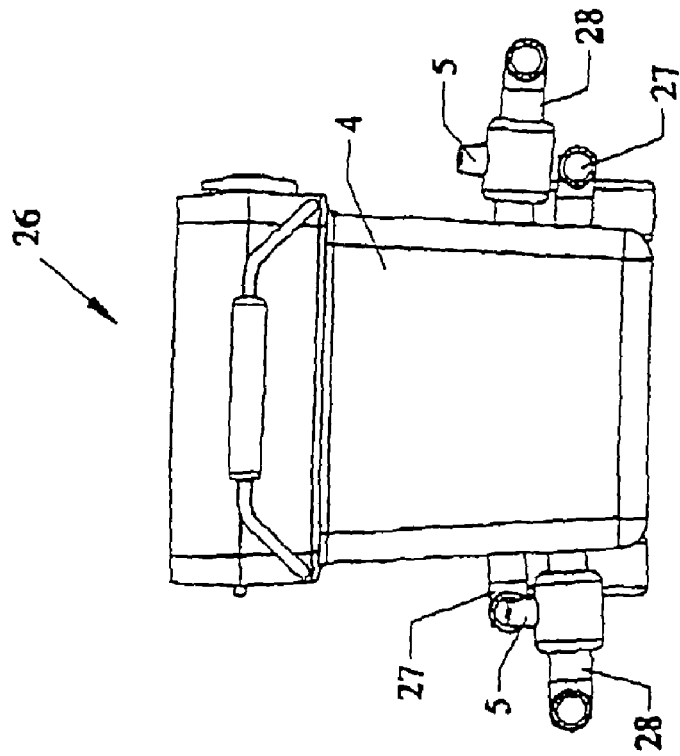
FIG. 21 is rear elevation view of the generator of FIG. 16.
Figure 22:
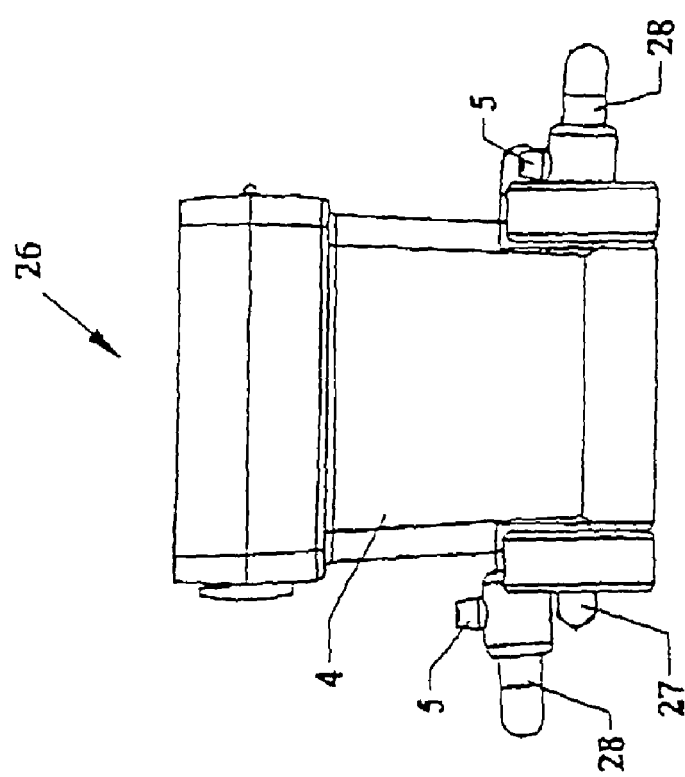
FIG. 22 is front elevation view of the generator of FIG. 16.

FIG. 21 is an external elevation view of the rear of auxiliary lamp box assembly 26 with housing 4, shut-off valves 5, exhaust fittings 28, and a rear view of one air intake fitting 27. FIG. 22 is an external elevation view of the front side of auxiliary lamp box assembly 26 with housing 4, shut-off valves 5, exhaust fittings 28, and a front view of both air intake fittings 27.

Figure 23:
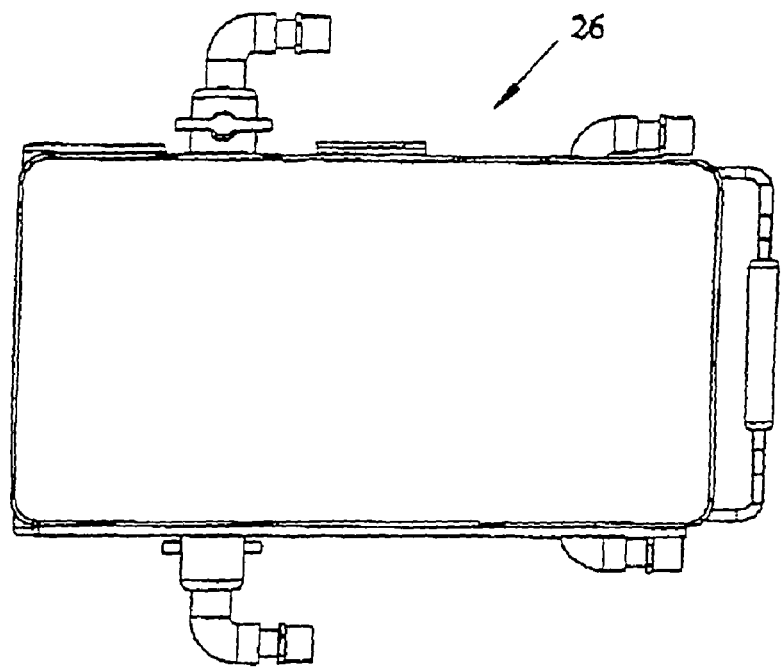
FIG. 23 is a top view of the generator of FIG. 16.
Figure 24:
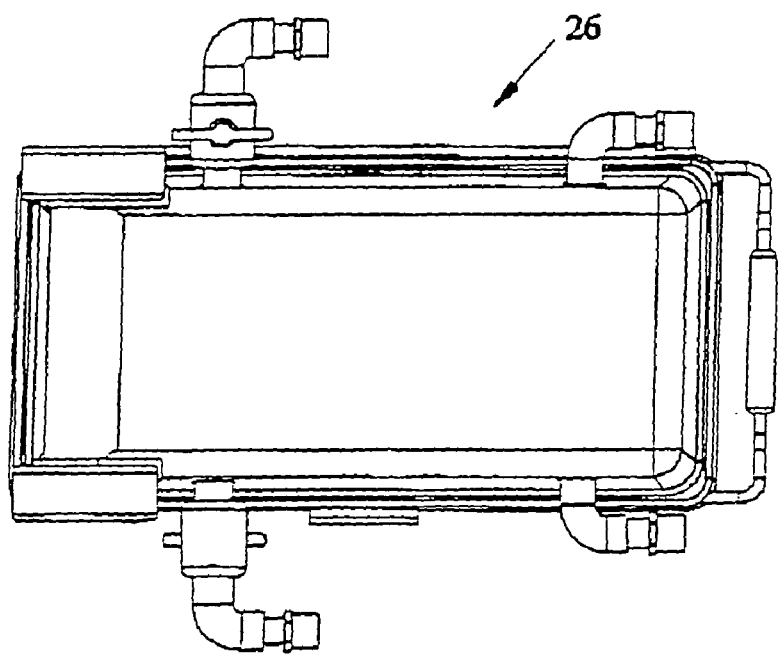
FIG. 24 is a bottom view of the generator of FIG. 16.

FIG. 23 is an external view of the top side of auxiliary lamp box assembly 26 and FIG. 24 is an external view of the bottom side of auxiliary lamp box assembly 26. These views illustrate the simplicity of the design of auxiliary lamp box assembly 26 of the present invention.

Figure 26:
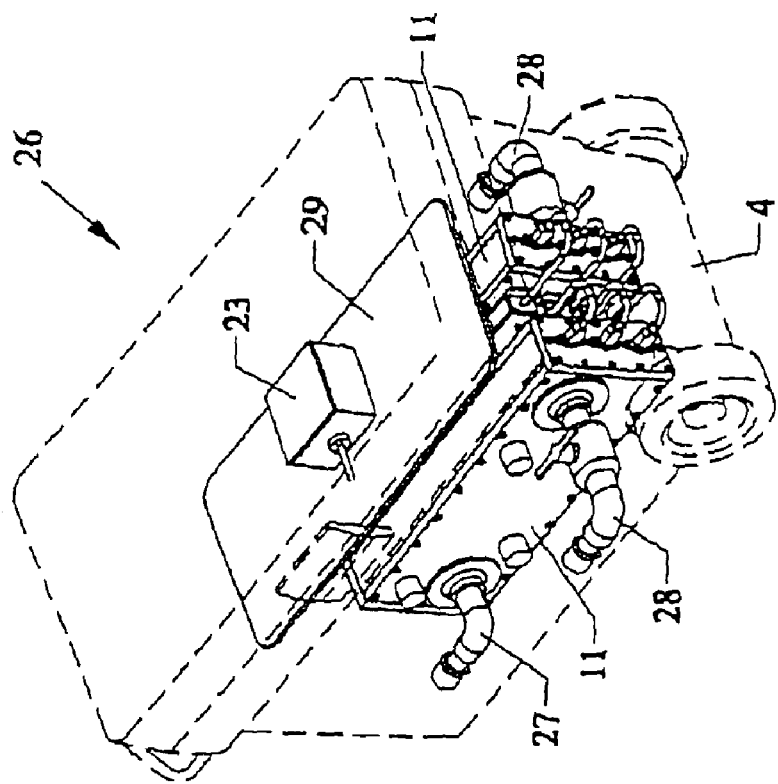
FIG. 26 is a rear right perspective view of the generator of FIG. 16 with one embodiment of a protective shelf and ghosted housing.
Figure 25:
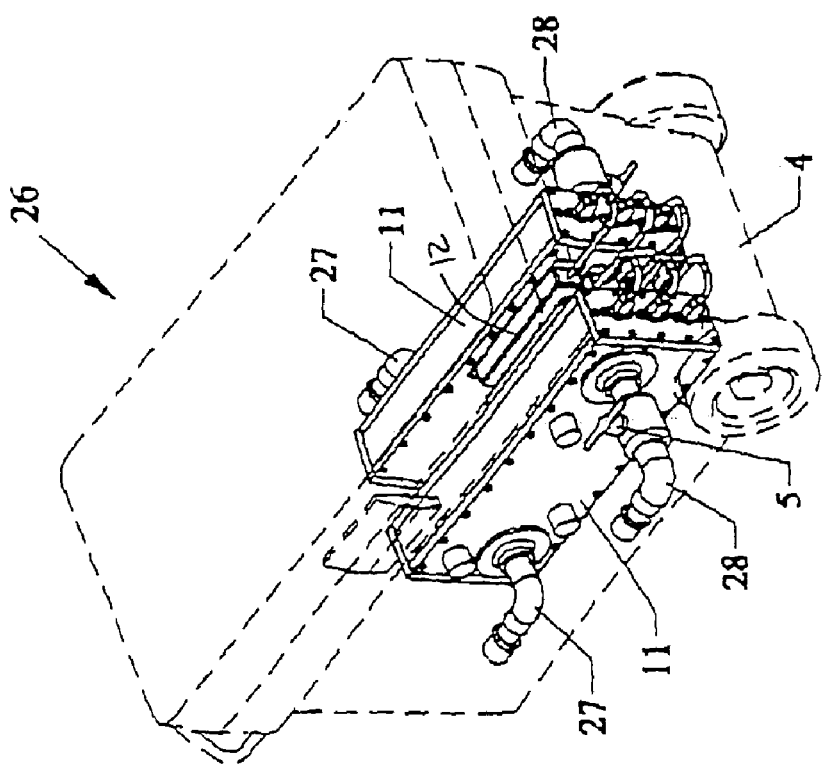
FIG. 25 is a rear right perspective view of the generator of FIG. 16 with ghosted housing.

In FIGS. 25 and 26, housing 4 is ghosted so that compact placement of the inner elements can be seen. In FIG. 25, the parallel alignment of the lamp housings 11, each with a series of three UV lamps, is shown. Also shown are external connections 27 for air intake, connections 28 for ozone exhaust, and shut-off valves 5 to control the flow of outbound ozone. FIG. 26 shows the parallel alignment of lamp housings 11, as well external connection 27 for air intake, connections 28 for ozone exhaust, and shut-off valves 5 to control the flow of outbound ozone. In addition, protective lamp box cover 29 is in place. Protective cover 29 is used to keep cords and other paraphernalia away from wires which lead to lamps 10 (not shown), thereby providing protection for lamps 10 and ballast 12. Centrally located on top of the protective cover 29 is wiring box 23 with wiring connections for the timer control, power cord and controller cable to the blower or other modular units of the present invention.

Suitable ultraviolet (UV) lamps 10 for the present invention can be obtained from well-known lamp manufacturers such as The General Electric Company and Westinghouse Company. These lamps are within the category of germicidal lamps. In one embodiment of the present invention, each lamp 10 produces 16 watts, is approximately 17 inches in length, and is rated for an effective life of 10,000 hours. An advantage of ozone generation using UV lamps is that no static, charge, or residue is produced.

FIGS. 27-39 show details of blower unit 32 that can be assembled as a separate module to move air from an enclosed space through a plurality of lamp housings 11. In one example, the plurality of lamp housings 11 are contained in one or more auxiliary housing modules 26. In another embodiment, lamp housings 11 are contained in stand-alone ozone generator 1.

Figure 27:
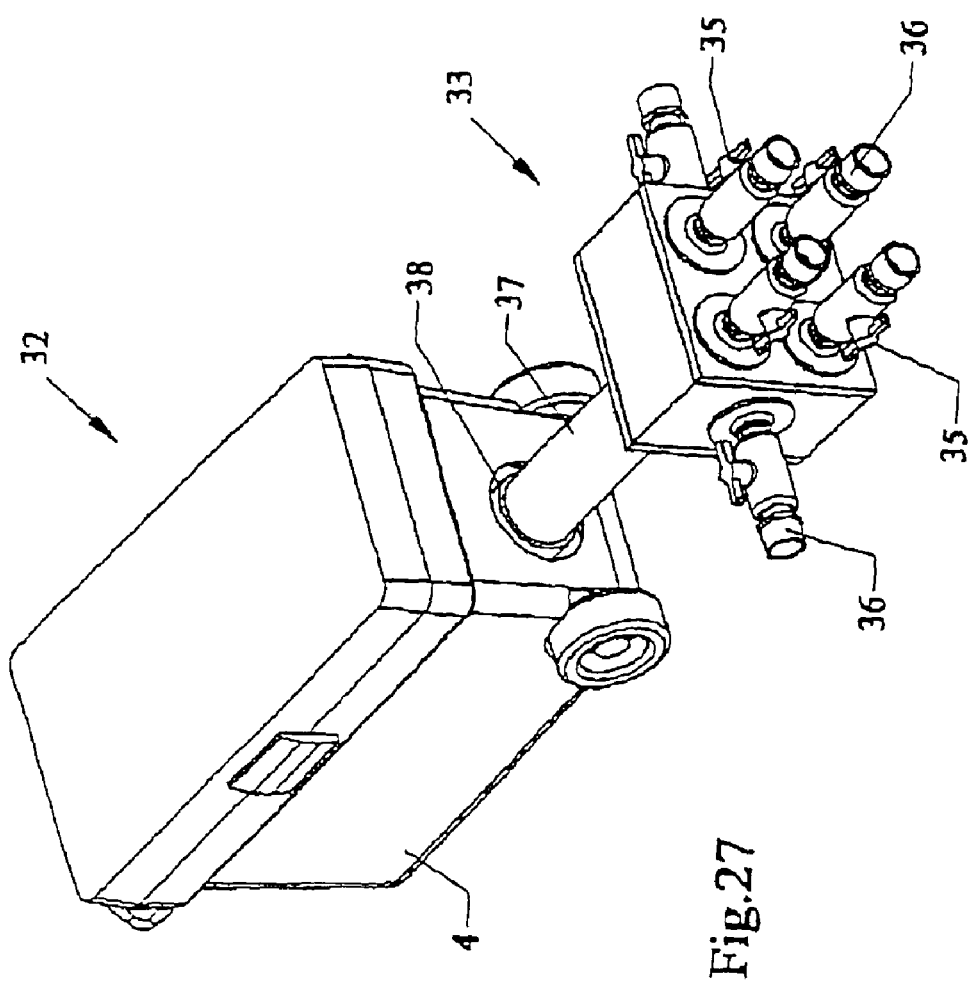
FIG. 27 is a rear right perspective view of one embodiment of a blower unit connected to one embodiment of a blower distribution plenum assembly.
Figure 28:
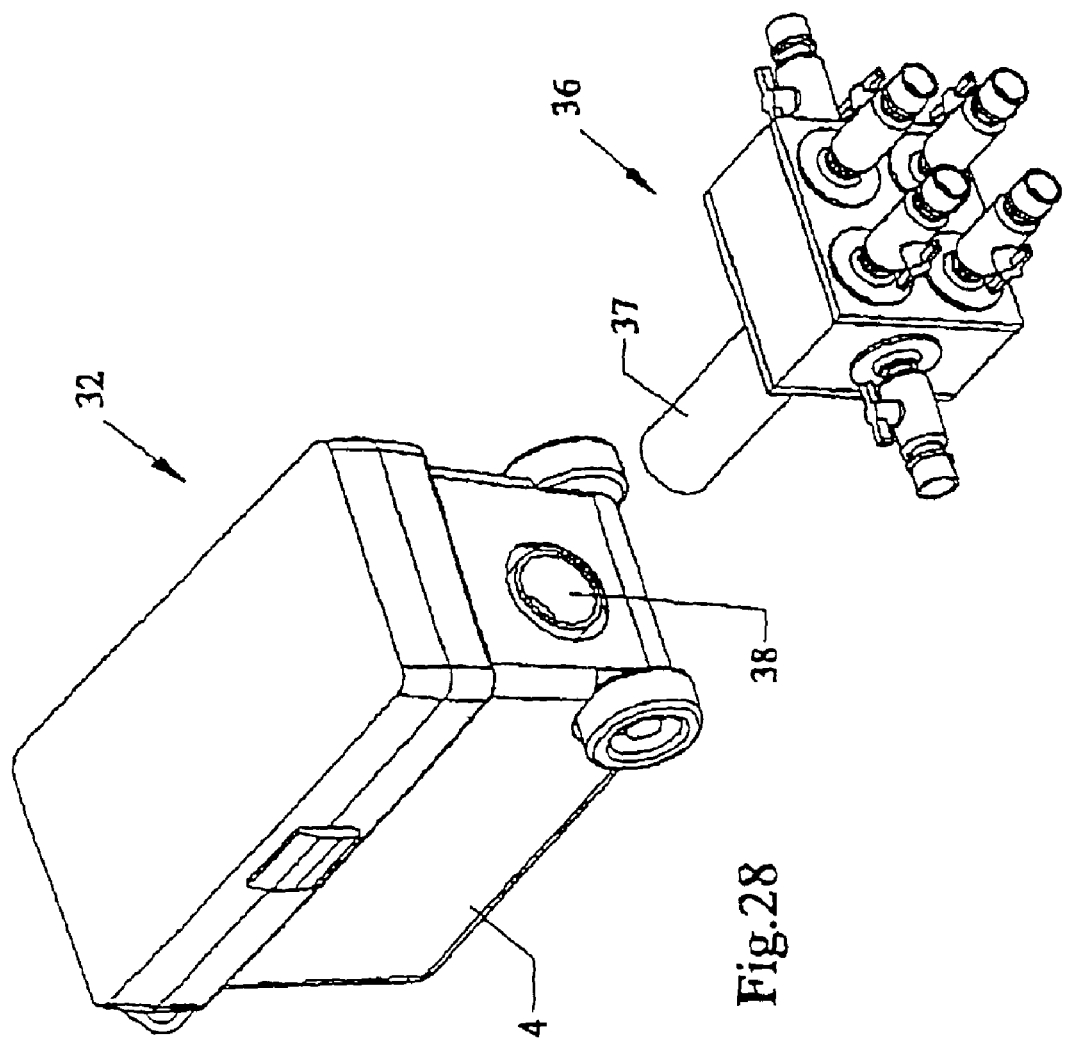
FIG. 28 is a rear right perspective view the embodiment of FIG. 27 showing the blower unit detached from the blower distribution plenum assembly.
Figure 29:
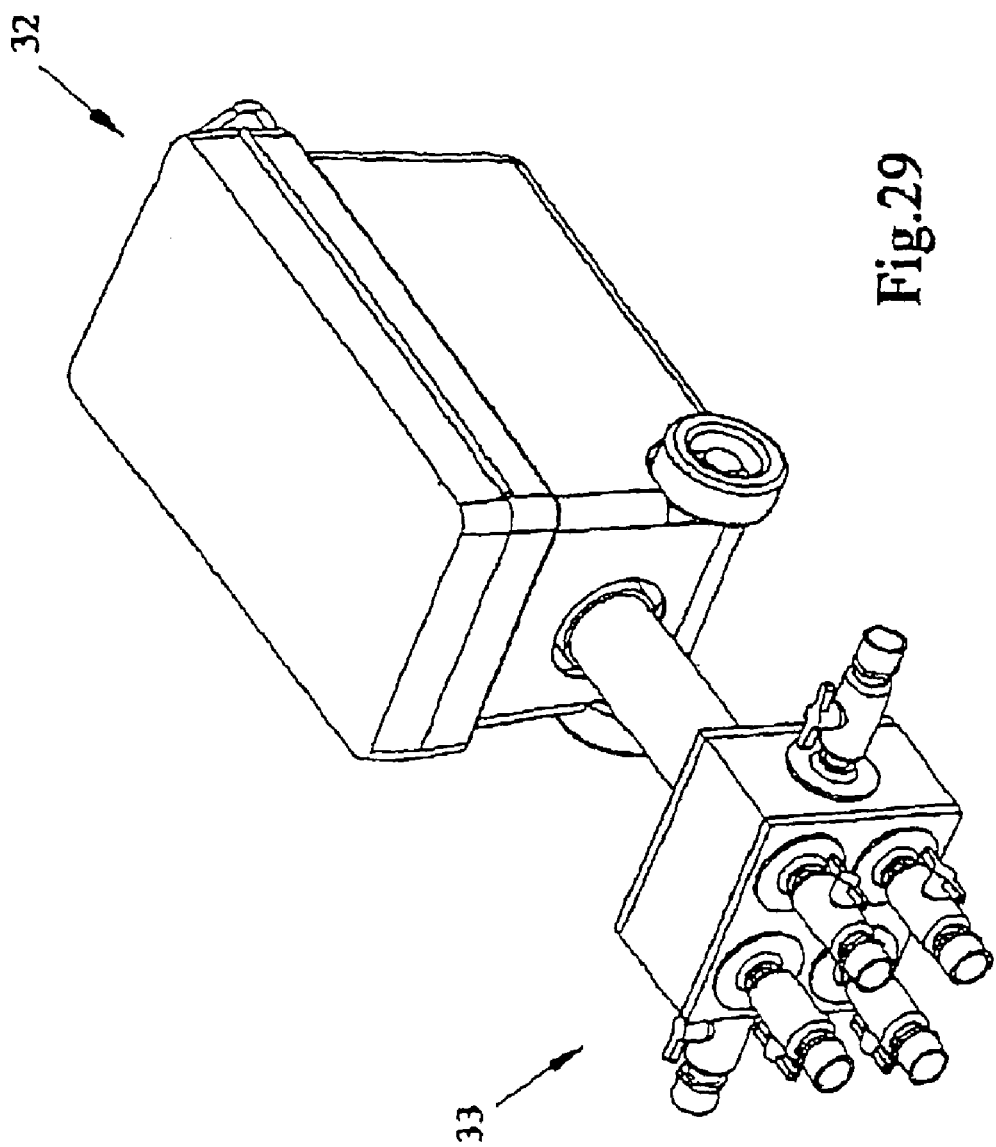
FIG. 29 is a rear left perspective view of the embodiment of FIG. 27.

FIG. 27 is a right rear perspective view of a blower unit 32 with attached blower distribution plenum assembly 33. Housing 4 for blower unit 32 has an opening for blower unit tube fitting 38 that is further connected to a plenum air supply tube 37, which feeds a plurality of outbound hose fittings 36 controlled by outbound shut-off valves 35. FIG. 28 is similar to FIG. 27, but shows plenum air supply tube 37 disconnected from blower unit 32. FIG. 29 is a left rear perspective view of blower unit 32 with a blower distribution plenum assembly 33 attached.

Figure 30:
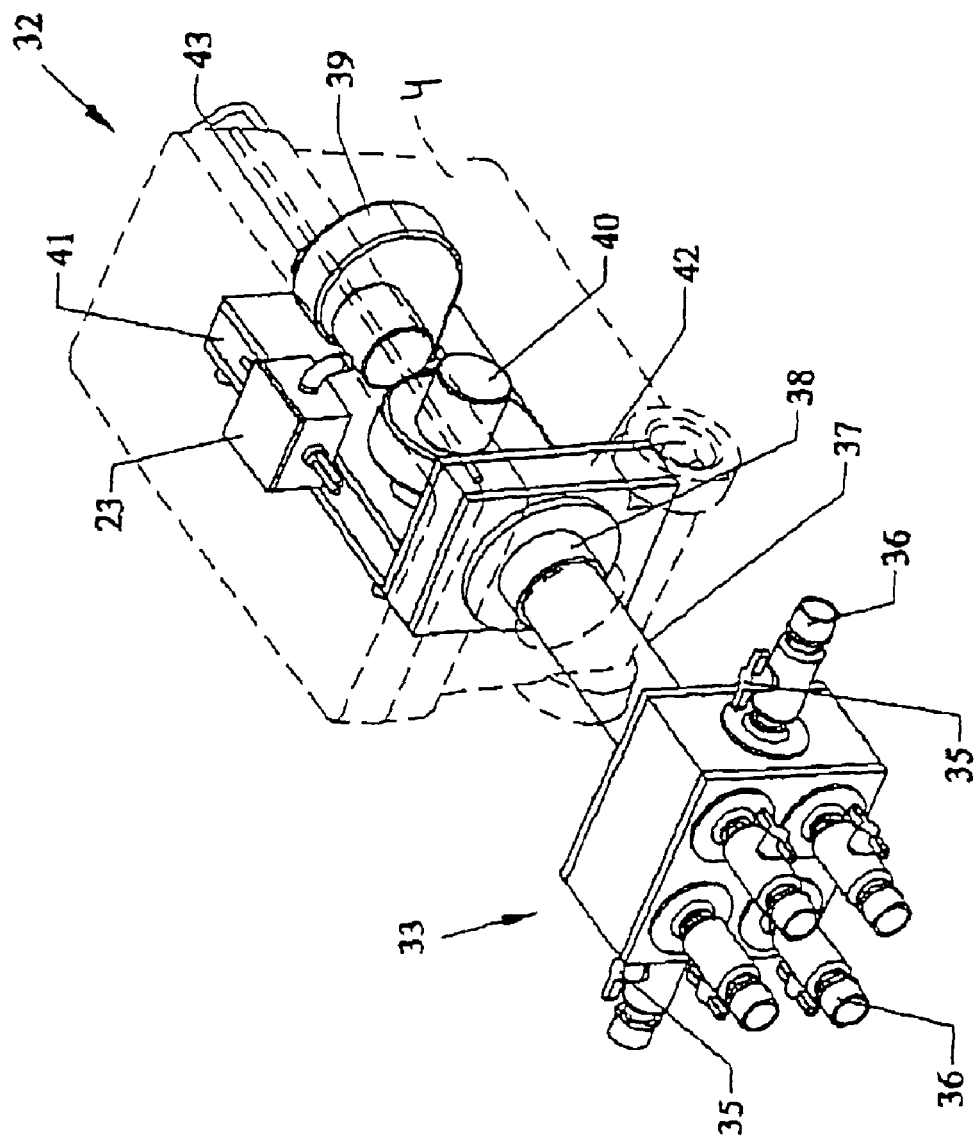
FIG. 30 is a rear left perspective view of the embodiment of FIG. 27 with the housing ghosted.

FIG. 30 is a right rear perspective view of blower unit 32 with plenum 33 attached and housing 4 ghosted. Inside housing 4, there are two blowers 39, 40 positioned so that air intake opening 43 of first blower 39 is perpendicular to the air intake of a second blower 40. Primary plenum 41 is connected to secondary plenum 42. Secondary plenum 42 fits snugly in the rear of housing 4 and is connected by tube fitting 38 to plenum air supply tube 37 of blower unit distribution plenum assembly 33. Wiring box 23 is generally centrally located over primary plenum 41. Pluralities of outbound shut-off valves 35 are part of the assembly of outbound hose fittings 36 of air distribution plenum 33.

Figure 31:
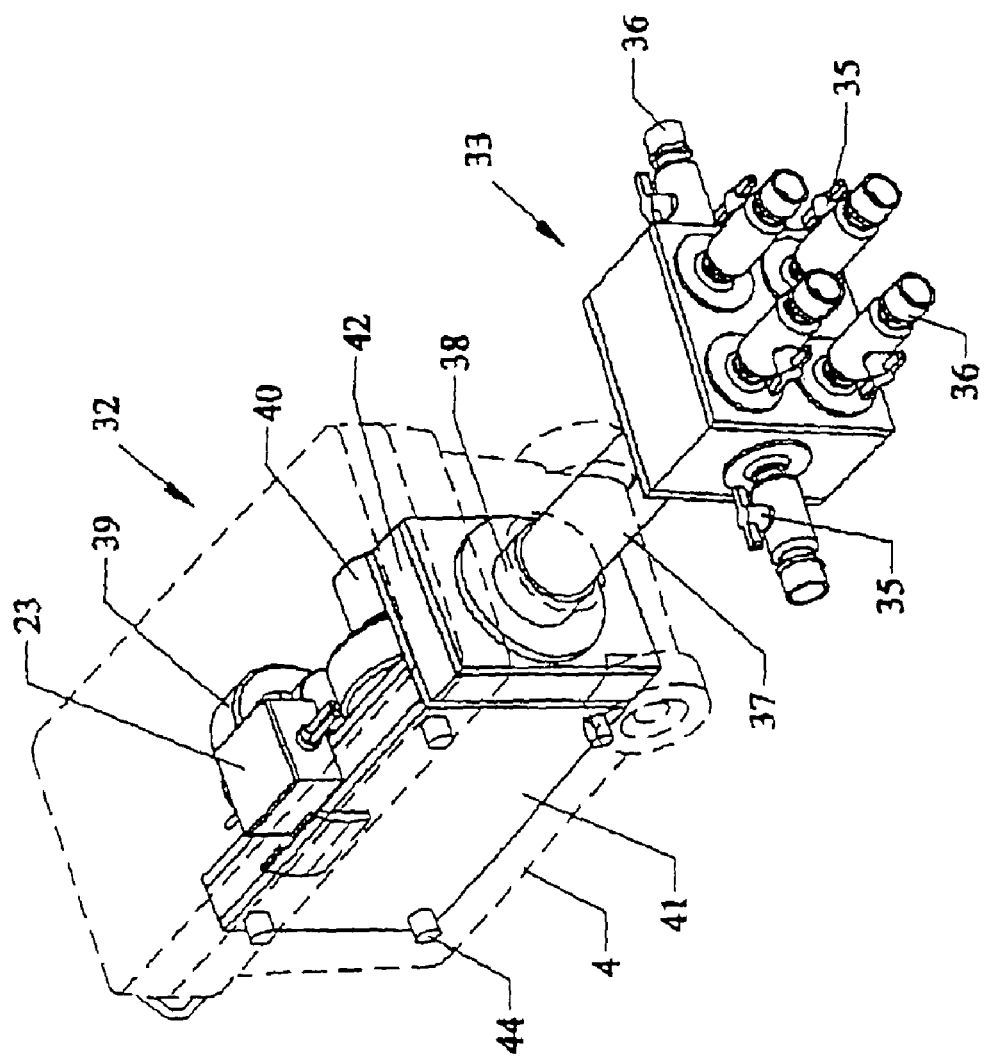
FIG. 31 is a rear right perspective view of the embodiment of FIG. 27 with the housing ghosted.

A right rear perspective view of blower assembly 32 is shown in FIG. 31. The right side of housing 4 shows a plurality of plenum mount bumpers 44 that are used to hold the blower assembly in a secure manner within housing 4. The other features shown in FIG. 30 are the same for FIG. 31, including first blower 39, second blower 40, primary plenum 41, secondary plenum 42, wiring box 23, and tube fitting 38 connected to air supply tube 37. In the illustrated embodiment, air distribution plenum assembly 33 has six outbound shut-off valves 35 attached to six outbound hose fittings 36.

FIG. 32 is a left side elevation view of blower unit 32 with attached air distribution plenum assembly 33. FIG. 33 is a right side elevation view of blower unit 32 with attached air distribution plenum assembly 33. In one embodiment, the overall dimensions of the attached units consisting of blower unit 32 and air distribution plenum assembly 33 are approximately 45 inches in length, approximately 16 inches in height and approximately 24 inches in width when measured across the widest part of the plenum assembly.

Figure 35:
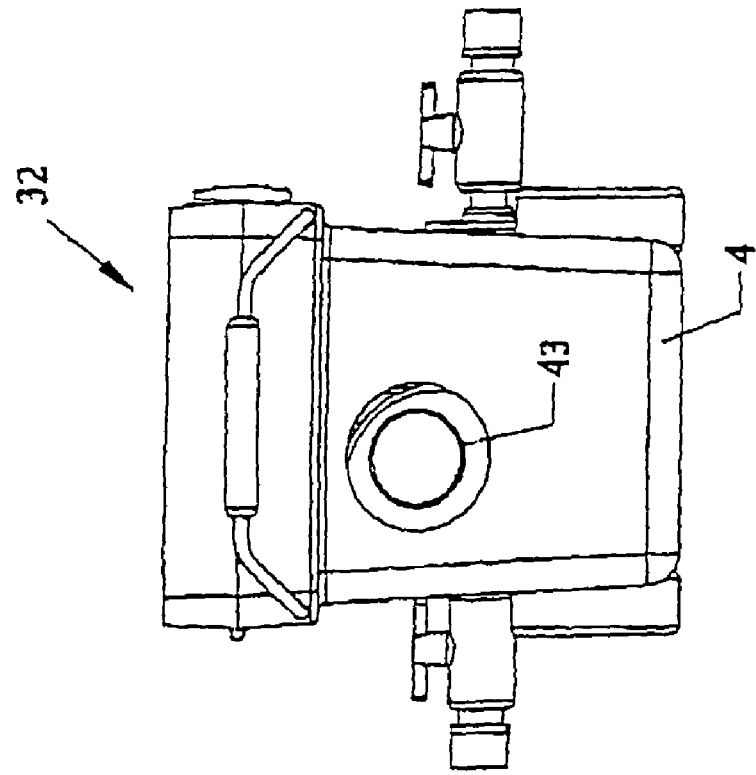
FIG. 35 is a front elevation view of the embodiment of FIG. 27.
Figure 34:
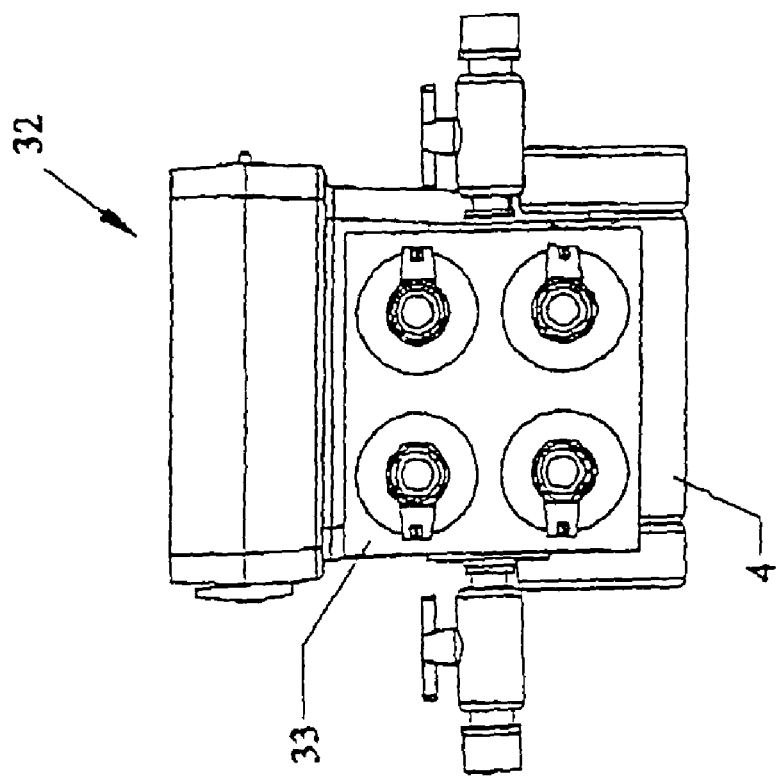
FIG. 34 is a rear elevation view of the embodiment of FIG. 27.

FIG. 34 is a rear elevation view of blower unit 32 showing air distribution plenum assembly 33. FIG. 35 is a front elevation view of blower unit 32 showing the circular opening cut directly in housing 4 for blower unit air intake 43.

FIG. 36 is a view of the top side of blower unit 32, with closed lid 8, connected to air distribution assembly 33 by plenum air supply tube 37; FIG. 37 is a view of the bottom side of blower unit 32 connected to air distribution assembly 33 by plenum air supply tube 37.

Figure 38:
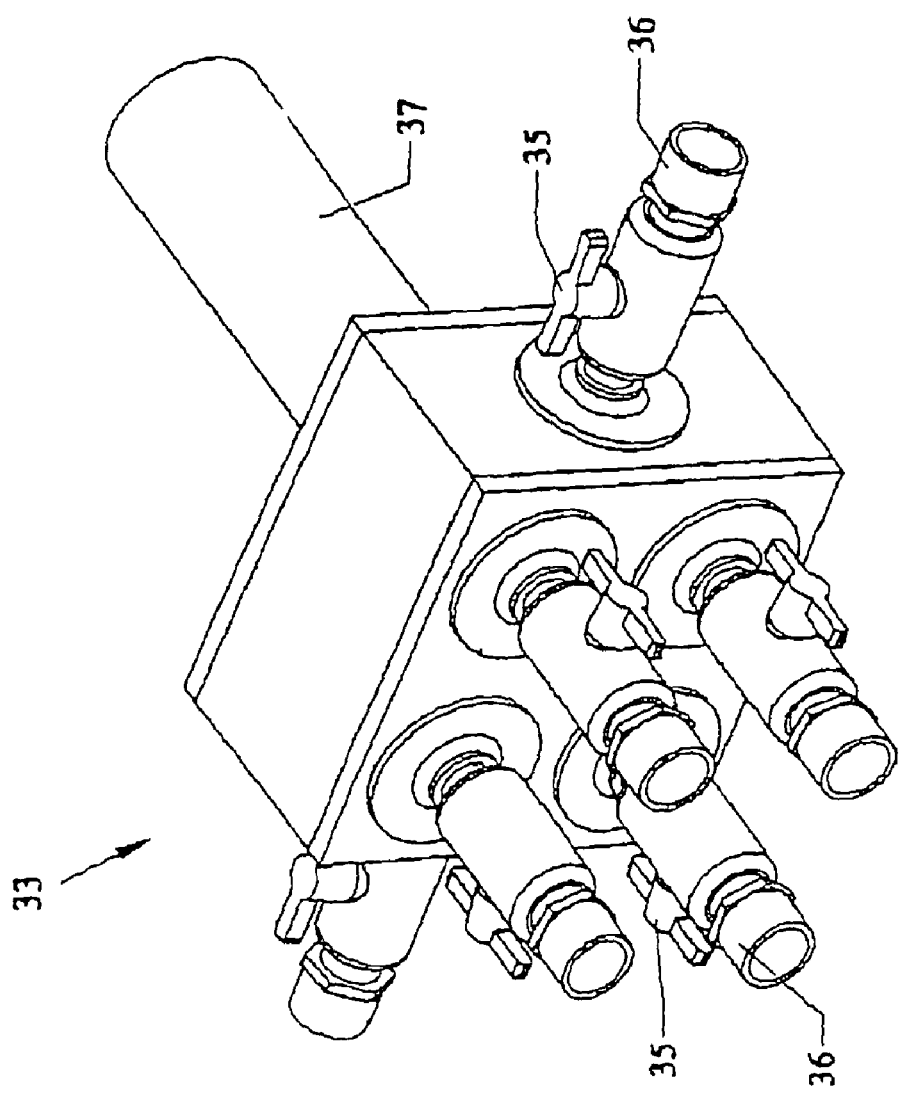
FIG. 38 is a rear left perspective view of a blower distribution plenum assembly of FIG. 27.

FIG. 38 is a left rear perspective view of air distribution plenum assembly 33. In the illustrated example, air distribution plenum assembly 33 has six outbound shut-off valves 35 that are attached to six outbound hose fittings 36. When hoses are attached to hose fittings 36, the air can be distributed to multiple areas reachable by the hoses, allowing a many-fold increase in areas and locations within a structure that can be treated simultaneously. In one embodiment, shut-off valves 35 and hose fitting 36 components are combined in a unit made of a durable plastic material and are connected to blower unit 32 (not shown) with plenum air supply tube 37.

Figure 39:
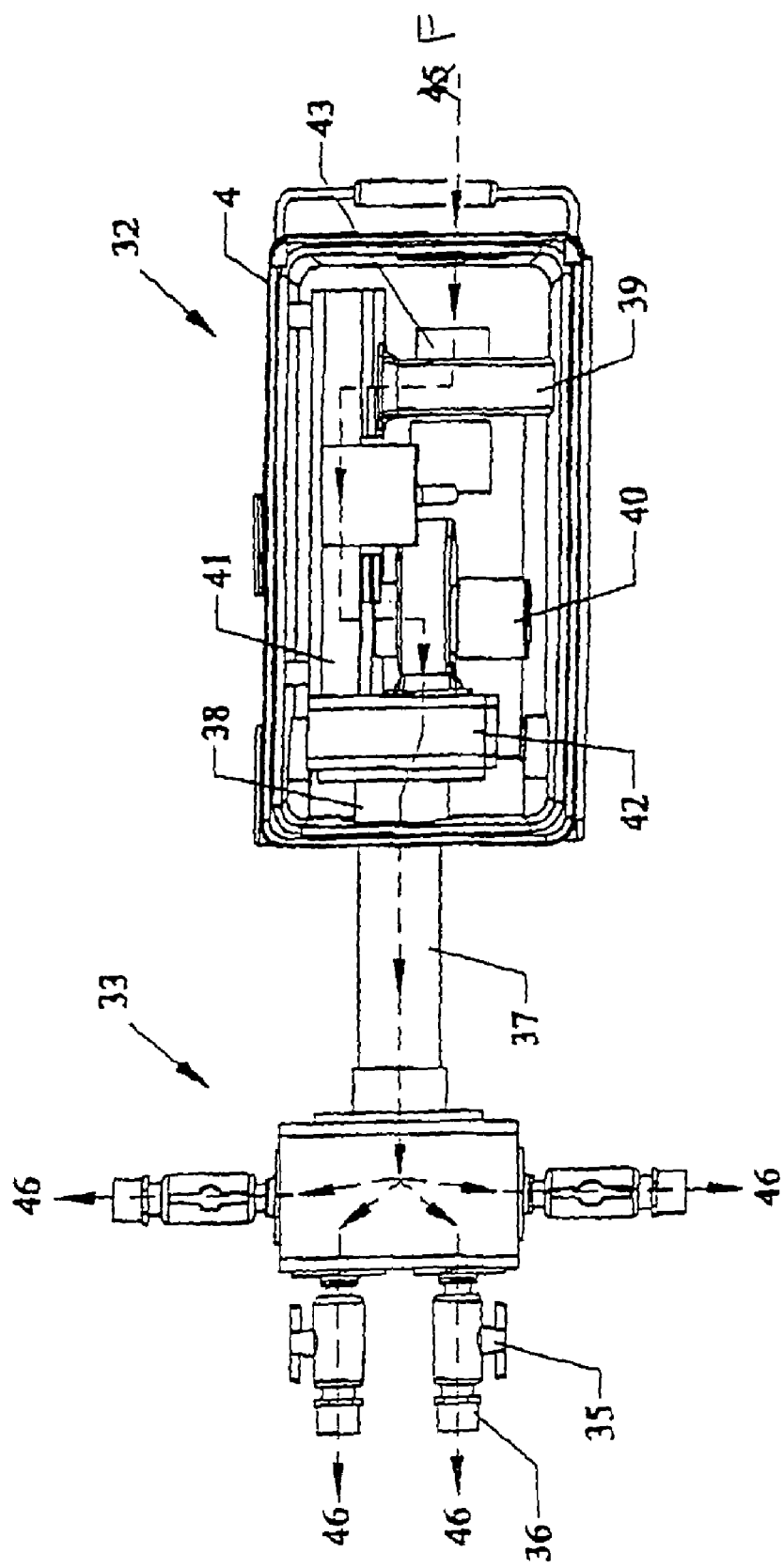
FIG. 39 is a top view of the embodiment of FIG. 27 without a lid, showing airflow.

FIG. 39 shows the path of air flow F through blower unit 32 and out of air distribution plenum assembly 33. Air enters intake opening 43 and is moved by first blower 39 into primary plenum 41. The air then flows into second blower 40 and then to secondary plenum 42, which is connected to tube fitting 38, which is further connected to plenum air supply tube 37. Tube 37 is securely fitted to air distribution assembly 33, which has a plurality of shut-off valves 35 with companion hose connections 36 for distributing airflow F to auxiliary lamp housing assemblies (not shown) containing UV lamps to convert oxygen in the air to ozone. In this configuration, one blower unit 32 can distribute air to up to six separate auxiliary lamp housing assemblies.

While a preferred blower in the present invention has the capacity to move 100 cfm, the selection of a blower is not a limitation herein. A person skilled in the art could easily choose a blower with the appropriate capacity based on design specifications to meet specific ozone generation requirements. The concentration of ozone is controlled by the volume of air pushed through the lamp housing assemblies containing UV lamps. As the volume of air increases, the amount of ozone increases; as the volume of air decreases, the amount of ozone decreases. In an embodiment, ambient air flow of approximately 35 cfm produces ozone at a concentration of about 79 ppm. The configuration of modules of blower units and lamp housing assemblies with UV lamps in the present invention has produced ozone in concentrations of from approximately 70 ppm to approximately 200 ppm at 35 cfm.

Figure 40:
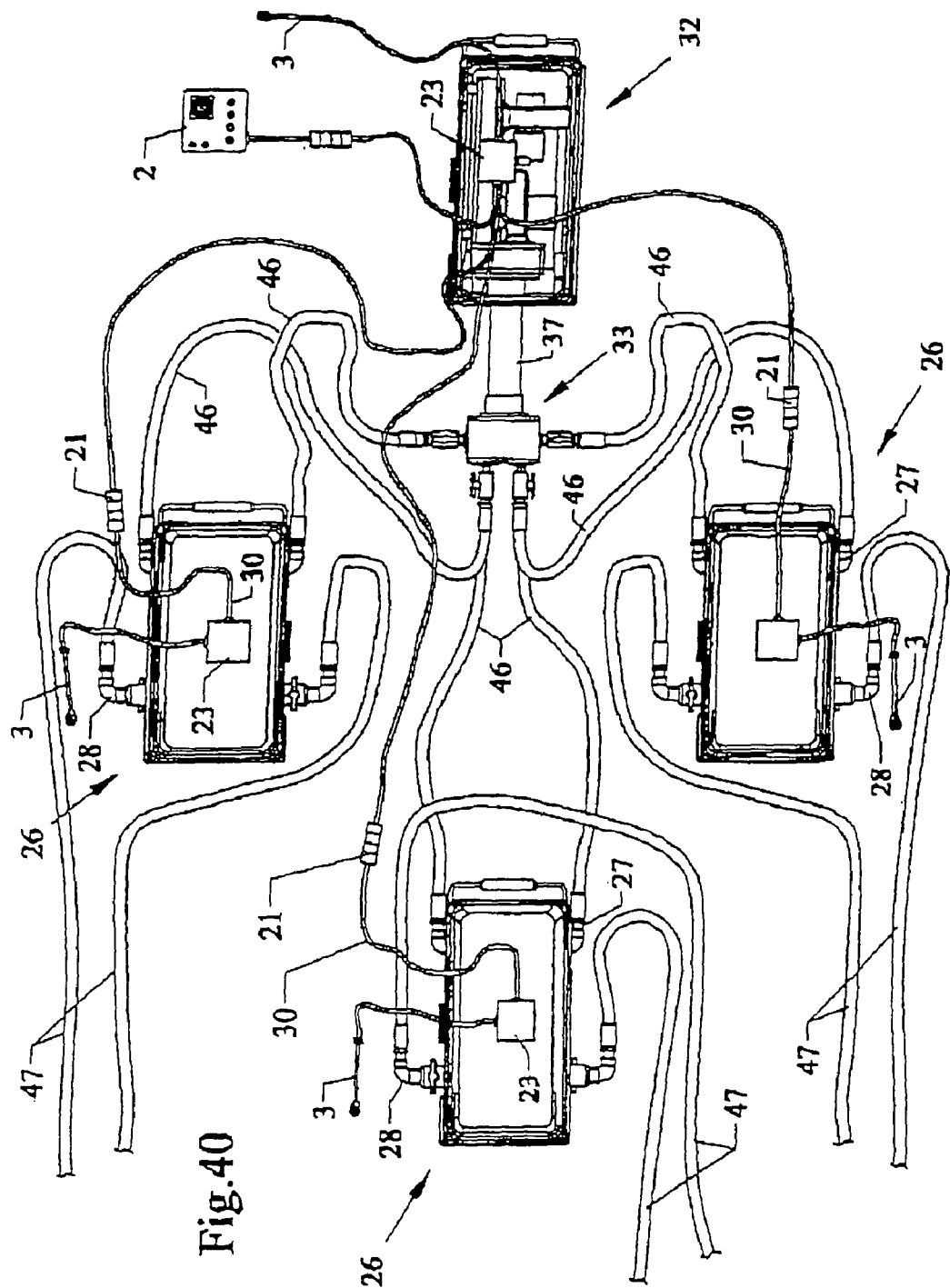
FIG. 40 is a top view of the embodiment of FIG. 27 connected to three other ozone generators, showing control (wiring) and airflow (hose) interconnections.

Referring now to FIG. 40, this is an illustration of one possible modular arrangement of components for assembly an ozone generator of the present invention. One blower unit 32 provides the force to move ambient air into three auxiliary lamp housing assemblies 26, each fitted with ozone exhaust hoses 47. One timer/controller unit 2 is attached to each modular combination to allow for remote operation and control of ozone generation.

Each auxiliary lamp housing assembly 26 in FIG. 40 is designed, arranged and assembled with parts as described in detail for FIG. 18. The blower unit 32 in FIG. 40 is designed, arranged and assembled with parts as described in detail for FIGS. 30 and 31. This example of a modular combination of blower unit 32 and lamp housing assemblies 26 provides ozone generation from three separate units 26 containing UV lamps; this arrangement can focus ozone treatment of indoor air in separate rooms or partitioned spaces. The arrangement of blower unit 32 and air supply plenum assembly 33 wherein each unit 26 can be separated from the other provides flexibility in connections and allows the ozone generator assembly of the present invention to be transported and assembled easily by one person.

Figure 41:
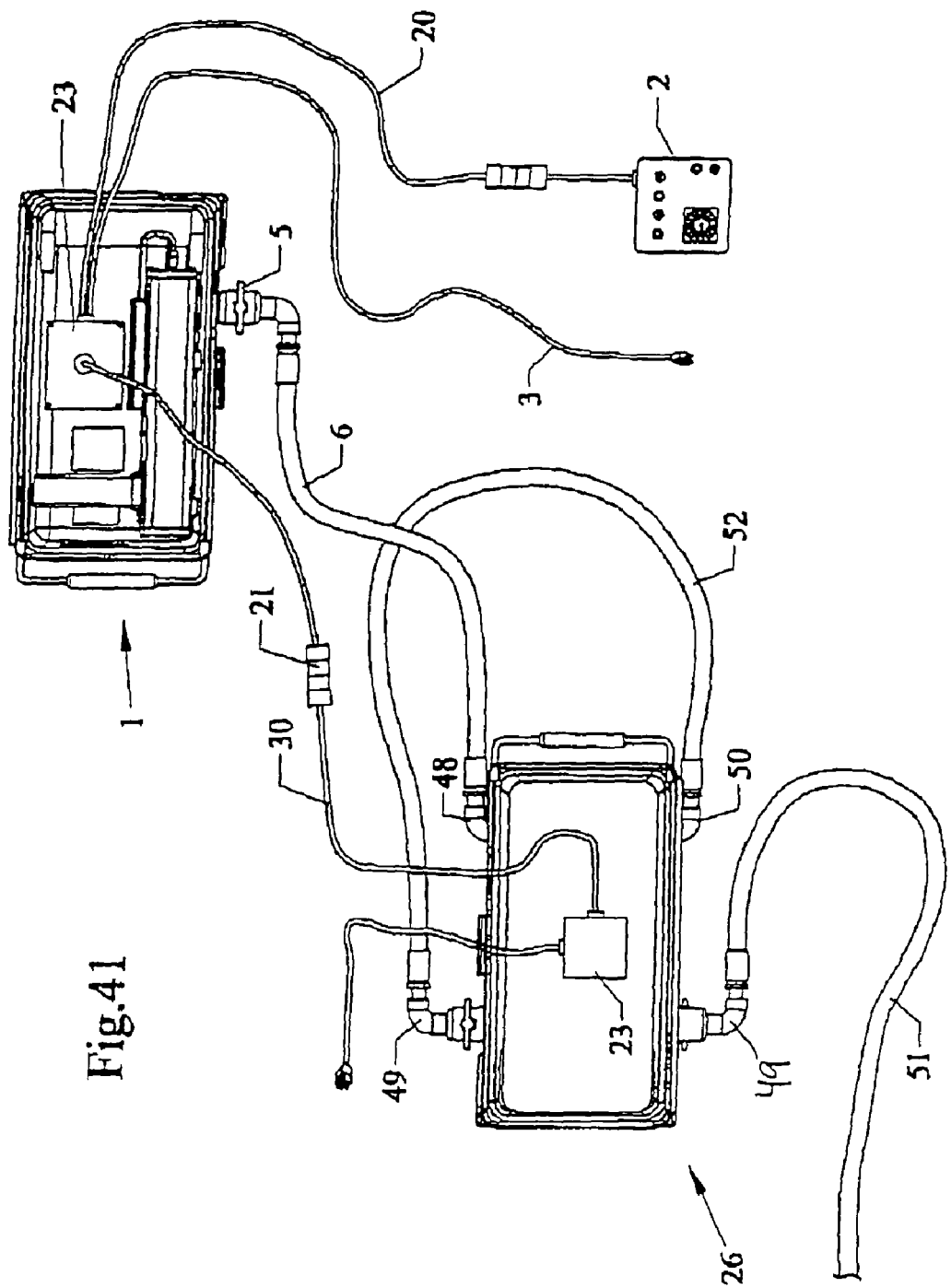
FIG. 41 is a top view of the embodiment of FIG. 13 connected to one other ozone generator, showing control (wiring) and airflow (hose) interconnections.

Another example of a modular combination includes one stand-alone ozone generator 1 connected to one auxiliary lamp housing assembly 26 as shown in FIG. 41. The modular combination in FIG. 41 provides a high concentration of ozone for distribution into an enclosed and unoccupied space. Ambient air enters generator 1, and ozone exits through shut-off valve 5. The air then travels through ozone distribution hose 6 to auxiliary lamp housing 26, which contains two UV lamp housings 11 in an arrangement as described above in FIGS. 25 and 26. The ozone from unit 1 feeds into auxiliary lamp housing intake 48, goes through a first UV lamp assembly, and becomes more concentrated; the first concentration of ozone exits from ozone shut-off valve and exhaust 49, and travels through a second ozone distribution hose 52 into a second auxiliary lamp housing intake 50. Thereafter, the first concentrated ozone goes through a second UV lamp assembly and becomes even more concentrated before exiting through shut-off valve and exhaust 49 as a double concentration of ozone for distribution through ozone distribution hose 51. In one example, the final ozone concentration exceeds 160 ppm. One benefit of concentrating ozone to this level is to overtake the volume of air and the total surface area of the building more quickly. The higher the concentration of ozone, the faster the air and surface areas are cleaned.

In another embodiment, generator 1 includes an air filter. In one such example, generator 1 operates with a fan and pump assembly. The fan circulates the air through the air filter. The pump moves air that has circulated through the air filter so that the air contacts radiation from the UV lamps. In one embodiment, generator 1 having a pump produces air with increased ozone content at higher than ambient pressure. In one example, generator 1 produces ozone-concentrated air with pressure of approximately 22 pounds per square inch (psi). Ozone under pressure can be directed to specific target areas for treating indoor air and killing mold, mildew, and fungi, for example.

In this example, a fan pulls ambient air into the air filter. An adjustment knob is provided in one embodiment to change air filter or pump settings. In one embodiment, the air filter element is similar in design to how an automobile air filter fits over a carburetor. The accordion type filter functions to remove particulates from ambient air.

Disinfectant Validation Process Analysis

A study was performed during the period Sep. 29, 2004 to Oct. 4, 2004 to determine the effectiveness of ozone treatment on eliminating seven specific airborne contaminants that are known to affect millions of people each year. The contaminants tested for elimination under strict laboratory conditions are the following: *Klebsiella pneumonia*, a cause of pneumonia; *Aspergillus niger*, a toxic mold; *Salmonella typhimurium*, a food borne bacterium; *Staphylococcus epidermis*, a common cause of skin infection; *Streptococcus pyrogenes*; a cause of strep ear, nose and throat infection; *Listeria monocytogenes*; a cause of infection acquired from household pets; and *Escherichia coli*; a bacterium found in animal and human waste.

Each of the above pathogenic contaminants was inoculated to at least a count of $10^7$ and then streaked out onto a nutrient agar to promote growth of each of the contaminants. After plating, each inoculated plate was incubated at a suitable temperature for an appropriate amount of time to achieve a representative count of the pathogenic organisms.

One milliliter (ml) of each pathogenic contaminant was streaked as a lawn plate and sealed. Each plate was labeled with the specific contaminant inside. All containers were placed undisturbed under laminar flow without outside air contaminates interfering with the testing process. In the interim, a quality control plate for each bacterial contaminant was introduced at the beginning and closed at the end of each analysis. The quality control plates were used to test the sterility of the plates used for analysis.

All positive contaminant plates that were streaked as lawn plates and sealed were then unsealed and placed inside a container for introduction of the ozone product from the present invention. All positive control plates were allowed 15 minutes of ozone and then removed, sealed and placed into a cooler for transportation to the laboratory for analysis. Approximately 200 milligrams of ozone per cubic meter of air were introduced for the test. 200 milligrams of ozone per cubic meter of air is equivalent to approximately 93 ppm.

Results of the testing for one sample of each positive contaminant are given in Table I below. The bacterial count after incubation is reported as the recovered count. CNT stands for control plate not treated with ozone. CT stands for control plate treated with ozone; after ozone treatment is a column for reduction in bacterial count.

TABLE I

| Bacteria | Recovered Count | CNT | CT | Reduction |
|---|---|---|---|---|
| *Escherichia coli* | $5 \times 10^7$ | $5 \times 10^7$ | 20 | 7 log |
| *Klebsiella pneumoniae* | $3 \times 10^7$ | $3 \times 10^7$ | 36 | 7 log |
| *Aspergillus niger* | $6 \times 10^7$ | $6 \times 10^7$ | 15 | 7 log |
| *Salmonella typhimurium* | $7 \times 10^7$ | | | |
| *Staphylococus epidermis* | $6 \times 10^7$ | $6 \times 10^7$ | 41 | 7 log |
| *Streptococcus pyrogenes* | $6 \times 10^7$ | $7 \times 10^7$ | 29 | 7 log |
| *Listeria monocytogenes* | $5 \times 10^7$ | $5 \times 10^7$ | 16 | 7 log |

The concentration of contaminants utilized for the above study is far greater than the number of bacteria or organisms typically isolated or detected from a single sample site. This offered an excellent challenge to the ozone disinfectant method provided by the present invention. Thus, the concentration of bacteria recovered from all inoculated and ozone treated samples show a 7 log reduction, resulting in at least approximately 98 to approximately 99 percent reduction in each of the airborne contaminants identified above.

Ambient air does not typically contain high concentrations of micro-organisms. Usually, such organisms are on suspended on solid materials or in moisture droplets. For example, micro-organisms such as the contaminants studied above can get into the air on dust or lint; on droplets of moisture from coughing, sneezing or talking; and from growth of sporulation of molds on walls, ceilings or floors.

The number of contaminants in the air depends largely on the locale and the activity in the environment. Free, unattached organisms are slightly heavier than air and will settle out very slowly in a quiet atmosphere. A gentle current, however, can keep them in suspension almost indefinitely. Bacteria-laden dust particles generally settle out rapidly.

The contaminants utilized in the above study are indicative of bacteria and microorganisms normally found in contaminated air that can benefit from cleaning by the ozone generating device of the present invention.

EXAMPLE 1

Large Health Center

A building of approximately 45,000 square feet of floor space that served as a health care facility for outpatient care was treated with the ozone generator device of the present invention. The facility is unoccupied at night and during the weekend. After removing all living plants, a stand-alone, portable generator of the present invention was placed in a central location within the facility. The timer/control unit was extended to an outside location that would not attract curious attention from man or animals. The timer was set for 24 hours. Total bacterial/mold contaminate count was determined before and after ozone treatment.

|  | Total Bacterial/Mold Contaminate Count For Site | Total Bacterial/Mold Contaminate Count Average Per Room |
|---|---|---|
| Before Ozone Treatment: | 11,910 | 2,382 |
| After Ozone Treatment | 1,378 | 429 |

The above ozone treatment resulted in an 82% reduction of normal flora bacterial/mold contaminants and a 100% reduction of toxic and harmful bacterial/mold contaminants at the health center site.

EXAMPLE 2

Residential Site #1

A private residence with approximately 1,800 square feet of floor space was treated with an ozone generator of the present invention. The occupants removed all living plants and pets and left the residence unoccupied over night. A stand-alone, portable, ozone generator was placed in the center of the floor space. The timer/control unit was extended to an outside location and hidden under a door mat. The timer was set for 12 hours of operation. As in Example 1, total bacterial/mold contaminate count was determined before and after ozone treatment.

|  | Total Bacterial/Mold Contaminate Count For Site | Total Bacterial/Mold Contaminate Count Average Per Room |
|---|---|---|
| Before Ozone Treatment: | 6,712 | 1,342 |
| After Ozone Treatment | 1,025 | 342 |

The ozone treatment of Residence #1 resulted in an 85% reduction of normal flora bacterial/mold contaminants and a 100% reduction of toxic and harmful bacterial/mold contaminants in the residence.

EXAMPLE 3

Residential Site #2

A private residence with approximately 5,000 square feet of floor space was treated with the ozone generator device of the present invention. The occupants removed all living plants and pets and left the residence unoccupied over night. A stand-alone, portable, ozone generator was placed in the center of a centrally located room. The timer/control unit was extended to an outside location and hidden under a planter near the door. The timer was set for 12 hours of operation. As in Example 1, total bacterial/mold contaminate count was determined before and after ozone treatment.

|  | Total Bacterial/Mold Contaminate Count For Site | Total Bacterial/Mold Contaminate Count Average Per Room |
|---|---|---|
| Before Ozone Treatment: | 4,014 | 803 |
| After Ozone Treatment | 459 | 153 |

The ozone treatment of Residence #2 resulted in an 84% reduction of normal flora bacterial/mold contaminants and a 100% reduction of toxic and harmful bacterial/mold contaminants in the residence.

EXAMPLE 4

One Story Office Building

A one-story office building with approximately 2600 square feet of floor space was treated with an ozone generator of the present invention. The building is located in Cocoa, Fla. and had suffered water damage from hurricanes in 2004. The occupants complained of musty odors, itchy eyes, stuffy noses and hives. The building is unoccupied at night and on weekends. On a Friday evening, a stand-alone, portable, ozone generator was placed inside the building near the front door. The timer/control unit was extended to an outside location and placed out of public view. The timer was set for twelve hours of operation. The rotatable shut-off valve control was turned 45° to allow the ozone to build up. The rotatable valve has a fully open position when rotated approximately 90 degrees. The building was treated with ozone at a concentration of about 79 ppm. The next day, the occupants of the office building had no complaints and were very surprised at the cleanliness of the air—no more musty odors and no feelings of irritation of the skin, eyes and nose. Approximately one month later, the occupants of the building still had no complaints about the air inside.

The present invention can also be used for the ozone treatment of water to purify the water by introducing the ozone into water (for example, by bubbling ozone-concentrated air through the water), thereby killing bacteria, viruses, and other microorganisms. The frequency of ozone treatments of indoor air or water is largely determined by the condition and quality of the air or water. Since there are no harmful residues, the treatment can be daily or at periodic intervals. For treating indoor air, all people, plants and pets (including birds and fish) should be removed from the premises to be treated.

The portable ozone generators of the present invention are easy to assemble and transport to a site that needs treatment for airborne contaminants or for water sterilization. The ozone produced through an ultraviolet process has been determined to be effective in killing toxic and harmful bacteria and can be utilized at effective concentrations when an indoor area is unoccupied. Because of the unstable nature of ozone, no residue is left behind—only a fresher, cleaner smell to the air or water that is enriched with oxygen when ozone has completed the disinfectant or purification function.

While the invention has been described, disclosed, illustrated and shown in various terms of certain embodiments or modifications, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A modular arrangement of components for assembling an ozone generator, the modular arrangement comprising:
   a first generator component comprising:
      a first portable housing having a fluid inlet and a fluid outlet; a first ultraviolet lamp contained within the first portable housing, wherein the first ultraviolet lamp emits ultraviolet radiation;
      a blower contained within the first portable housing, wherein the blower moves air into contact with radiation from the first ultraviolet lamp; and
      a control remotely connected to the first portable housing for turning the first generator component on and off; and
   a second generator component comprising:
      a second portable housing having a fluid inlet and a fluid outlet; and a second ultraviolet lamp contained within the second portable housing, wherein the second ultraviolet lamp emits ultraviolet radiation; and
      a hose connecting a fluid outlet of the first generator component to a fluid inlet of the second generator component;
      wherein the first and second portable housings are configured to enable a user to stack the first and second portable housings on top of one another in order to aid transport of the first and second portable housings.

2. The modular arrangement of claim 1, wherein the first generator component further comprises a first plurality of ultraviolet lamps contained within the first portable housing, wherein each of the first plurality of ultraviolet lamps emits ultraviolet radiation.

3. The modular arrangement of claim 1, wherein the second generator component further comprises a second plurality of ultraviolet lamps contained within the second portable housing, wherein each of the second plurality of ultraviolet lamps emits ultraviolet radiation.

4. A modular arrangement of components for assembling an ozone generator that can simultaneously produce ozone for several locations, comprising:
   a plurality of generator components, each comprising:
      a first portable housing having fluid inlet and a fluid outlet; and an ultraviolet lamp contained within the first portable housing, wherein the ultraviolet lamp emits ultraviolet radiation;

at least one blower component comprising:

a second portable housing having a fluid inlet and a fluid outlet;

a blower having a fluid inlet and a fluid outlet, wherein the blower moves air into contact with radiation from each of the ultraviolet lamps; and a control remotely connected to the blower for turning the blower on and off; and at least one hose connecting a fluid outlet of the at least one blower component to a fluid inlet of each of the generator components.

5. The modular arrangement of claim 4 wherein the blower has the capacity to move approximately 100 cubic feet of air per minute.

6. The modular arrangement of claim 4 wherein each generator component further comprises a plurality of ultraviolet lamps.

* * * * *